US012319297B2

(12) United States Patent
Bradley et al.

(10) Patent No.: US 12,319,297 B2
(45) Date of Patent: Jun. 3, 2025

(54) PREDICTING AND MINIMIZING RISKS ASSOCIATED WITH VEHICLE USAGE CONTEXTS

(71) Applicant: AT&T Intellectual Property I, L.P., Atlanta, GA (US)

(72) Inventors: Nigel Bradley, Canton, GA (US); Rashmi Palamadai, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 316 days.

(21) Appl. No.: 17/935,809

(22) Filed: Sep. 27, 2022

(65) Prior Publication Data

US 2024/0101128 A1 Mar. 28, 2024

(51) Int. Cl.
*B60W 50/00* (2006.01)
*B60W 40/04* (2006.01)
(Continued)

(52) U.S. Cl.
CPC ........ *B60W 50/0098* (2013.01); *B60W 40/04* (2013.01); *B60W 40/08* (2013.01); *B60W 50/0097* (2013.01); *B60W 50/14* (2013.01); *G06N 20/00* (2019.01); *B60W 2050/143* (2013.01); *B60W 2050/146* (2013.01); *B60W 2540/043* (2020.02); *B60W 2540/223* (2020.02);
(Continued)

(58) Field of Classification Search
CPC .. B60W 50/0098; B60W 40/04; B60W 40/08; B60W 50/0097; B60W 50/14; B60W 2554/4041; B60W 2540/043; B60W 2556/10; B60W 2556/45; B60W 2540/223; B60W 2050/143; B60W 2050/146; G06N 20/00
See application file for complete search history.

(56) References Cited

U.S. PATENT DOCUMENTS 8,660,734 B2 * 2/2014 Zhu .................... G05D 1/0055
701/23
9,248,834 B1 * 2/2016 Ferguson .......... B60W 50/0097
(Continued)

OTHER PUBLICATIONS

Guofa Li et al., "Risk assessment based collision avoidance decision-making for autonomous vehicles in multiple-scenarios" Jan. 2021 vol. 122, abstract.*

*Primary Examiner* — Gertrude Arthur Jeanglaude
(74) *Attorney, Agent, or Firm* — Guntin & Gust, PLC; John G. Rauch

(57) ABSTRACT

Techniques are described that facilitate predicting and minimizing risks associated with vehicle usage contexts. In one example, a method comprises obtaining, by a system comprising a processor, vehicle state information identifying occupants and objects of a vehicle and relative positions of the occupants and the objects about the vehicle in association with a current usage context of the vehicle. The method further comprises determining, by the system, an assessment of potential injuries associated with the current usage context of the vehicle based on analysis of the vehicle state information, wherein the analysis comprises evaluating potential movement of the occupants and the objects. The method further comprises determining, by the system, risk information regarding a risk associated with the current usage context of the vehicle as a function of the assessment.

20 Claims, 10 Drawing Sheets

(51) Int. Cl.
  *B60W 40/08* (2012.01)
  *B60W 50/14* (2020.01)
  *G06N 20/00* (2019.01)

(52) U.S. Cl.
  CPC . *B60W 2554/4041* (2020.02); *B60W 2556/10* (2020.02); *B60W 2556/45* (2020.02)

(56) References Cited

U.S. PATENT DOCUMENTS

| | | | |
|---|---|---|---|
| 9,646,428 B1 * | 5/2017 | Konrardy | G06Q 10/0635 |
| 10,026,130 B1 * | 7/2018 | Konrardy | B60R 21/00 |
| 2003/0209893 A1 * | 11/2003 | Breed | B60N 2/853 |
| | | | 701/45 |
| 2013/0046562 A1 * | 2/2013 | Taylor | G06Q 40/00 |
| | | | 705/4 |

* cited by examiner

PREDICTING AND MINIMIZING RISKS ASSOCIATED WITH VEHICLE USAGE CONTEXTS

TECHNICAL FIELD

This disclosure relates to computer-implemented techniques for predicting and minimizing risks associated with vehicle usage contexts.

BACKGROUND

The modern car is increasingly becoming a mobile Internet of Things (IoT) sensor-laden device that senses the surrounding environment and interacts with cloud-based platforms using onboard wireless communication network connectivity. These technological advancements are driving new business models in the automotive sector directed to keeping drivers more aware and more efficiently aided in managing road and traffic conditions, possibly resulting in a well-managed traffic flow and fewer injuries.

DETAILED DESCRIPTION

Figure 1:
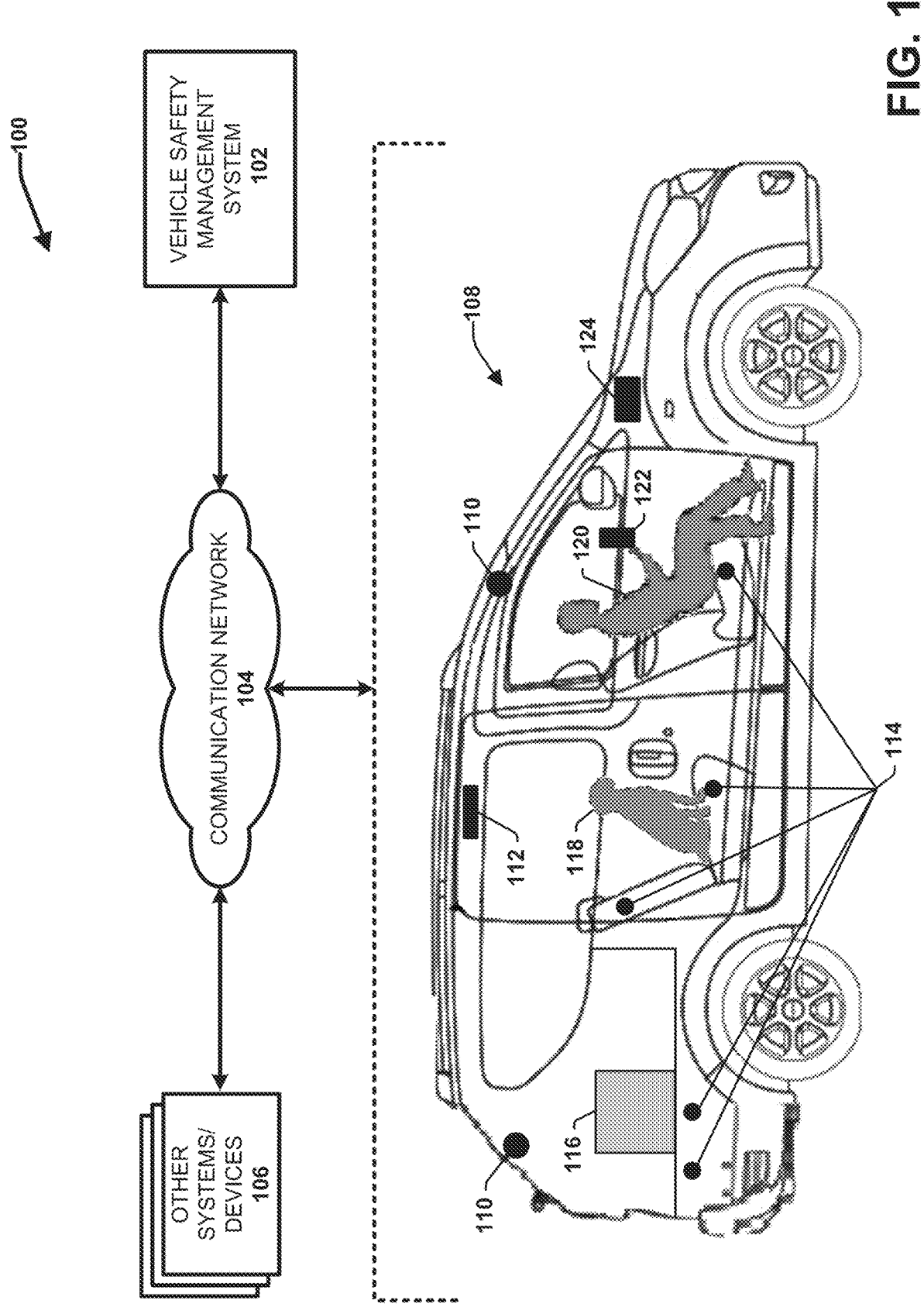
FIG. 1 illustrates a non-limiting architecture diagram of an example system that facilitates predicting and minimizing risks associated with vehicle usage contexts in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, or in this Detailed Description section.

As mentioned, the modern car is increasingly becoming a mobile Internet of Things (IoT) sensor-laden device capable of sensing information about its internal and external environment and interacting with cloud-based platforms using onboard wireless communication network connectivity. In addition, advancements in machine learning (ML) and artificial intelligence (AI) have facilitated processing massive amounts of diverse sensory feedback to provide a wide range of applications that can optimize vehicle operations in an automated and personalized way. The disclosed subject matter leverages these tools to facilitate predicting and minimizing risks associated with different vehicle usage contexts, particularly risks of injury to occupants and cargo of the vehicle as well as risks of injury to other vehicles and their occupants. The different usage contexts can relate to the context in which the vehicle is being used, the occupants (e.g., driver and passengers) and cargo of the vehicle, and the external environment of the vehicle (including surrounding vehicles, the vehicle location and route, current traffic, weather and road conditions, and other environmental factors).

To facilitate these and related ends, one or more embodiments of the disclosed subject matter are directed to a vehicle safety management system that analyzes sensory feedback captured via one or more onboard sensors of the vehicle (e.g., cameras, motion sensors, pressure sensors, etc.) to understand the occupants of a vehicle and its cargo, the position and arrangement of the occupants and the cargo, and how the occupants and the cargo may be harmed (e.g., injured/damaged) as a function of their position and arrangement, and other factors (e.g., cargo object type, occupant height/weight, occupant age, occupant health profile, etc.) in the event of an accident or otherwise over the course of use/operation of the vehicle. For example, the system can determine whether and to what degree an occupant could get hurt in the event of an accident, turbulent driving operations/conditions and/or normal driving operations/conditions due to their relative physical position within the vehicle, their height/weight/age, safety belt usage (or lack thereof), and various other factors. In another example, the system can determine whether any unsecured objects (e.g., located on or within the vehicle) and could injure any of the occupants, the vehicle, other vehicles and/or become damaged in event of accident, turbulent driving operations/conditions and/or normal driving operations/conditions.

In various embodiments, the system can perform a physics analysis on possible accidents and how contents of a vehicle may move and become injured/damaged in the event of the possible accidents, and/or turbulent driving operations/conditions and/or normal driving operations/conditions. The system can further estimate the probability of injury and/or damage to respective occupants, cargo items, the vehicle itself, and surrounding vehicles based on the physics analysis and other factors (e.g., driver risk profile, route, current road, weather and traffic conditions, etc.). Additionally, or alternatively, the system can employ machine learning (ML) and artificial intelligence (AI) techniques to learn and infer how occupants and cargo may be harmed (e.g., injured/damaged) as a function of their position and arrangement on or within a vehicle in the event of an accident or otherwise over the course of use of the vehicle based on analysis of historical vehicle usage and accident information. In various embodiments, injury analysis can be tailored to different vehicle types (e.g., make, model, year and associated vehicle features) and usage contexts.

The system can further raise alerts based on a determination that one or more risk probabilities indicate a potential for harm (e.g., relative to one more risk thresholds). The alerts can be presented to the occupants via in-vehicle displays and/or personal mobile devices of the respective occupants (e.g., smartphones, smartwatches, etc.) and include a mechanism for receiving and tracking user feedback indicating acknowledgment of the risks. For example, the driver can be presented with a prompt identifying the risks and requesting a response to the question, "Do you fully understand and accept the risks?". The system can also help the occupants to understand their risks through presentation of renderings (e.g., video and/or image data) of potential accidents and simulated object/occupant movements. In some implementations, the system can also intervene and modify one or more operations of the vehicle (e.g., speed, route, etc.) in a manner determined to minimize risks. The system can further determine or infer (e.g., using ML and AI techniques) and suggest changes to the seating positions of the occupants and better ways to secure their cargo to lower identified and reassess the risks thereafter. The system can further regularly and/or continuously evaluate the risks over the course of operation of the vehicle.

The system can further connect to emergency services, public safety resources, and occupant's phone and/or social media contacts to communicate appropriate details out in valuable ways. In some embodiments, the system can generate (e.g., using ML and AI) different vehicle usage context profiles and/or models/templates that correlate different occupant and cargo arrangements and settings to respective risks and mechanisms for responding to and minimizing the risks. The system can further employ the vehicle usage context profiles to provide quick adaptation to others new to such a system or changing use of their vehicle. Finally, the system also enables public safety to request control of self-driving vehicles without occupants to aid in pursuits related to minimizing detected risks.

In this regard, in an example embodiment, a vehicle safety management system is described that comprises a processor and a memory that stores executable instructions that, when executed by the processor, facilitate performance of operations that facilitate determining and minimizing risks associated with different vehicle usage contexts. The operations comprise obtaining vehicle state information identifying occupants and objects of a vehicle and relative positions of the occupants and the objects about the vehicle in association with a current usage context of the vehicle. The operations further comprise determining an assessment of potential injuries associated with the current usage context of the vehicle based on analysis of the vehicle state information, wherein the analysis comprises evaluating potential movement of the occupants and the objects. The operations further comprise determining risk information regarding one or more risks associated with the current usage context of the vehicle as a function of the assessment.

In various implementations, the potential injuries can include injuries to the occupants, the objects, and the vehicle. The operations can further comprise obtaining vehicle environment information regarding an environment of the vehicle and determining the assessment based on the environment information as well. For example, the environment information can relate to a second vehicle located within a defined vicinity of the vehicle and the potential injuries can further include injuries associated with the second vehicle.

In one or more implementation, the operations further comprise generating an alert in response to one or more of the risks satisfying an alert criterion (e.g., exceeding a risk threshold or another alter criterion), and sending the alert to a device associated with an occupant of the occupants or an entity external to the vehicle other than the occupant. The alert can enable acknowledgment of the one or more risks by the occupant or the entity, the operations further comprise tracking reception of the acknowledgement from the device based on input from the occupant or the entity to the device. In some implementations wherein the one or more risks relates to a potential injury, and the operations can further comprise sending injury information regarding the potential injury, wherein the injury information comprises a visual simulation of the potential injury. In some aspects, the system can generate the visual simulation based on the risk information and the analysis of the potential movement of the occupants and the objects.

In some embodiments, the operations further comprise determining a modification to the relative positions of the occupants and the objects about the vehicle that reduces an effect of the potential injuries in response to the one or more risks being determined to satisfy an alert criterion, and sending recommendation information regarding the modification to a device associated with an occupant of the occupants. In some aspects, determining the modification can include determining a security process applicable to secure of an occupant the occupants or the objects. Additionally, or alternatively, the operations can comprise determining a modification to an operation or route of the vehicle determined to reduce an effect of the potential injuries in response to the one or more risks being determined to satisfy the alert criterion or another alert criterion, and sending recommendation information regarding the modification to a device associated with an occupant of the occupants and/or controlling an operation or route of the vehicle to reduce the one or more risks. In this regard, the specific responses performed by the system (e.g., raising an alert, suggesting a modification to the position/arrangement of the occupants/ cargo, controlling an operation of the vehicle, etc.) can be tailored based on the type of risk (e.g., injury/damage), the degree of risk and the vehicle usage context.

In various implementations, determining the risk information is based on the current usage context of the vehicle and a defined risk profile for the current usage context, and wherein the defined risk profile varies for different defined usage contexts. The injury and risk assessment can further account the types of the objects, the height/weight of the occupants, the health profiles of the occupants and other factors. In some aspects, the evaluating the potential movement comprises simulating the potential movement of the occupants and the objects under different vehicular accident conditions. In various embodiments, determining the assessment comprises employing a machine learning model adapted to forecast at least one of the potential injuries based on historical injuries associated with a type of the vehicle, different occupant configurations, and different object configurations described in historical vehicular accident information representative of past vehicular accidents.

The terms "algorithm" and "model" are used herein interchangeably unless context warrants particular distinction amongst the terms. The terms "artificial intelligence (AI) model" and "machine learning (ML) model" are used herein interchangeably unless context warrants particular distinction amongst the terms.

Embodiments of systems and devices described herein can include one or more machine-executable components or instructions embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. These computer/machine executable components or instructions (and other described herein) can be stored in memory associated with the one or more machines. The memory can further be operatively coupled to at least one processor, such that the components can be executed by the at least one processor to perform the operations described. In some embodiments, the memory can include anon-transitory machine-readable medium, comprising the executable components or instructions that, when executed by a processor, facilitate performance of operations described for the respective executable components. Examples of said and memory and processor as well as other suitable computer or computing-based elements, can be found with reference to FIG. 9 (e.g., processing unit 904 and system memory 906 respectively), and can be used in connection with implementing one or more of the systems or components shown and described in connection with FIG. 1, or other figures disclosed herein.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a non-limiting architecture diagram of an example system 100 that facilitates predicting and minimizing risks associated with vehicle usage contexts in accordance with one or more embodiments of the disclosed subject matter. System 100 includes a vehicle safety management system 102 communicatively coupled to a vehicle 108 via a communication network 104. The communication network 104 can include any suitable communication network that enables wireless communication between one or more communication devices located on or within the vehicle 108 and the vehicle safety management system 102. For example, communication devices located on or within the vehicle 108 can include one or more integrated communication devices (e.g., communication device 112) that are built into the vehicle 108 and/or user equipment (UE) associated with one or more occupants of the vehicle (e.g., UE 122 associated with occupant 120). The communication network 104 can also communicatively couple the vehicle safety management system 102 and/or the vehicle to various other systems/devices 106. For example, the other systems/devices 106 can include other communication devices associated with other entities (e.g., users/people, other vehicles, etc.) remote from the vehicle 108, IoT devices, and various network accessible data sources and computing systems that can provide information and/or services employable by the vehicle safety management system 102 (e.g., traffic/road condition monitoring systems, weather systems, social medial systems, first responder/public safety systems, etc.).

In some embodiments, the non-limiting term communication device (CD), user equipment (UE), or a similar term is used. It can refer to any type of wired or wireless device that can communicate with another communication device in a wired or wireless communication system via one or more communication networks (e.g., communication network 104). In this regard, communication devices can communicate information to other communication devices via the communication network 110, which can comprise a core network that can operate to enable wireless communication between communication devices. For example, a wireless communication device (e.g., a connected vehicle, a mobile, cell or smart phone, an electronic tablet or pad, a personal computer, or another type of communication device) can connect to and communicate with a wireless communication network to communicate with another communication device connected to the wireless communication network or to another communication network (e.g., Internet Protocol (IP)-based network, such as the Internet) associated with (e.g., communicatively connected to) the wireless communication network. Communication devices can operate and communicate via wireless or wireline communication connections (e.g., communication links or channels) in a communication network to perform desired transfers of data, utilize services, engage in transactions or other interactions, and/or perform other operations.

In this regard, the communication network 104 can comprise but is not limited to, one or more wireless networks, or a combination of one or more wireless and wired networks, including, but not limited to, a cellular or mobile network, a wide area network (WAN) (e.g., the Internet), a local area network (LAN), and combinations thereof. Such networks can include Universal Mobile Telecommunications System (UMTS) networks, Long-Term Evolution (LTE) networks, Third Generation Partnership Project (3GPP) networks (or 3G), Fourth Generation (4G) networks, Fifth Generation (5G) networks, Sixth Generation (6G) networks (and beyond), Code Division Multiple Access (CDMA) networks, Wi-Fi networks, Worldwide Interoperability for Microwave Access (WiMAX) networks, General Packet Radio Service (GPRS) networks, Enhanced GPRS, Ultra Mobile Broadband (UMB), High Speed Packet Access (HSPA), Evolved High Speed Packet Access (HSPA+) networks, High-Speed Downlink Packet Access (HSDPA) networks, High-Speed Uplink Packet Access (HSUPA) networks, Zigbee networks, or another IEEE 802.XX technology networks. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on), and satellite networks. The communication network 104 can be associated with a single network provider, multiple network providers, and/or encompass a variety of different type of wired and wireless communication technologies (e.g., 3GGP, Wi-Fi, LTE, satellite, 5G, etc.) and sub-networks.

The type (e.g., make/model, year, etc.) and features and functionalities of the vehicle 108 can vary. In this regard, it should be appreciated that although the vehicle 108 illustrated in system 100 corresponds to a sports utility vehicle (SUV), the vehicle 108 can include any type of automotive vehicle (e.g., a sedan, a truck, a van, a bus, etc.), including automotive vehicles used for personal contexts, professional contexts (e.g., shipping and transport), manually operated vehicles, and self-driving vehicles. In addition, it should be appreciated that the vehicle safety management system 102 can be adapted to monitor, assess and minimize risks associated with a plurality of different vehicles in real-time. In this regard, although system 100 depicts a single vehicle, it should be appreciated that system 100 can include a plurality of different vehicles with same or similar features and functionalities as vehicle 108 that are communicatively coupled to the vehicle safety management system 102.

In various embodiments, the vehicle 108 can include one or more sensors (e.g., sensors 110 and sensors 114) capable of capturing information regarding the internal and external environment of the vehicle 108. In particular, the one or more sensors 110 and/or sensors 114 can capture information regarding the occupants and objects located on and/or within the vehicle 108, including relative positions of the occupants and the objects about the vehicle 108 (e.g., inside the vehicle, carried by the vehicle externally (e.g., in an exposed truck bed or the like), towed by the vehicle, etc.), and relevant characteristics of the occupants and objects (e.g., occupant identities and/or demographic characteristics (e.g., height, weight, age, gender, etc.), object type, object size (e.g., dimensions, weight, geometry, etc.), object material composition, object material composition, etc.). Reference to an occupant of a vehicle is herein to refer to a human being located within a vehicle, including passengers and drivers, and reference to objects located on or within a vehicle is used herein to refer to any non-human entity (e.g., object or thing, including animals).

For example, in the embodiment shown, the vehicle 108 includes a single occupant 120 corresponding to the driver (located in the drivers' seat) of the vehicle and cargo objects including a pet 118 (i.e., a dog) located in the back seat of the vehicle, and a box 116 located in the trunk of the vehicle. In some implementation, the identities and relative positions of the occupants (e.g., occupant 120) and objects (e.g., pet 118, box 116, etc.) of the vehicle 108 can be determined based on analysis of image data captured inside the vehicle 108 (e.g., via one or more cameras) using existing image analysis technologies (e.g., object recognition, facial recognition, video motion tracking, three-dimensional modeling technologies, etc.). Additional information regarding the relative positions and characteristics of the occupants and objects can also be detected via one or more sensors, such as pressures sensors, motion sensors, weight sensors, proximity sensors, and so on distributed throughout the vehicle. Information regarding the relative positions of occupants can include information identifying or inditing their physical body position (e.g., body pose/posture) and geometry relative to the physical structures/fixtures of the vehicle in three-dimensional (3D) space. For example, as applied to an occupant, the system 100 can characterize how a person is sitting (or laying, standing, etc.) in a particular seat of the vehicle, such as their posture and how/where their respective body parts are positioned relative to seat, floor, ceiling, dashboard, windows, etc. (e.g., feet on the floor, cross-legged, feet on the dashboard, etc.). Information regarding the occupants and objects can also include information regarding any restraints (e.g., seat belts, ropes, ties, pockets, containers, slots, etc.) or security mechanisms used (or not used) to secure the respective occupants and/or objects on or within the vehicle 108.

In this regard, the one or more sensors 110 and/or sensors 114 can include but are not limited to, image sensors (e.g., cameras), acoustic sensors (e.g., microphones and other audio capture devices), motion sensors (e.g., accelerometers, inertial measurement units, etc.), pressure sensors, weight sensors, proximity sensors, location sensors, chemical sensors, thermal sensors, scanners, analog sensors, digital sensors, infrared sensors, ultrasonic sensors, activity sensors, gaze detection sensors, and other types of sensors. In one or more exemplary embodiments, sensors 110 respectively correspond to cameras adapted to capture image data (e.g., still images and/or video) of the internal and external environment of the vehicle 108 and sensors 114 can correspond to one or more other types of sensors (e.g., pressure sensors, weight sensos, motion sensors, acoustic sensors, infrared sensors, chemical sensors, thermal sensors, etc.). It should be appreciated however that the number, type and distribution of the respective sensors 114 and sensors 110 can vary.

In accordance with the embodiment shown, information regarding the internal and external environment of the vehicle 108 captured via the one or more sensors 110 and/or 114 can be sent (e.g., transmitted) to the vehicle safety management system 102 by a communication device located on or within the vehicle 108 via the communication network 104 for processing in association with evaluating and minimizing potential risks (e.g., injuries/damage) that may arise in the event of an accident and/or other driving operations as a function of the relative positions of the occupants and objects about the vehicle 108, the characteristics of the occupants and objects, and various other factors. In some embodiments, the information sent to the vehicle safety management system 102 can include raw sensory data (e.g., image data, sensor measurements, etc.) captured via the one or more sensors 110 and/or 114 and the vehicle safety management system 102 can be configured to process the raw sensory data to correlate the raw data to corresponding relevant information (e.g., the relative positions and characteristics of the occupants and objects determined using corresponding sensory data processing technologies). In other embodiments, some or all of the captured sensory data can be processed the vehicle using onboard processing (e.g., via an integrated computing device 124) and sent to the vehicle safety management system 102 as processed data identifying the relative positions and characteristics of the occupants and objects.

In this regard, in some embodiments, the vehicle 108 can include an integrated computing device 124 configured to control and/or manage various electrical, mechanical and/or communication operations of the vehicle 108. For example, the computing device can include at least one processor and memory that stores executable instructions that define and control one more operations of the vehicle 108. In some implementations, the operations can include the capture of sensory data via the one or more sensors 110 and 114 (e.g., vehicle internal state data and external environment data), processing of the sensory data and/or communication of the raw and/or processed sensory data to the vehicle safety management system 102. With these embodiments, the respective sensors 110 and 114 can be communicatively and operatively coupled to the computing device 124 via any suitable wired or wireless communication technology.

In some implementations, the computing device 124 can include a communication component that comprises suitable communication hardware and software that facilitates wireless communication between the vehicle and the safety management system 102 via the communication network 104. In other embodiments, some or all of the communication hardware and software can be provided in a separate communication device 112 that can be communicatively coupled (e.g., via a wired or wireless connection) to the computing device 124 and/or the respective sensors 110 and 114. Still in other embodiments, the computing device 124 and/or the one or more sensors 110 and 114 can be communicatively coupled to the communication network via 104 via one or more communication devices associated with one or more occupants of the vehicle, such as UE 122 associated with occupant 120. For example, the UE 122 can include any suitable computing device associated with user, such as but not limited to, a mobile phone, a smartphone, a personal tablet, a laptop computer, or a wearable device (e.g., a smartwatch, a health/biometric monitoring device, an augmented reality (AR) eye-ware device (e.g., glasses, goggles, smart lenses, etc.), a virtual reality (VR) eye-ware devices, an extended reality (XR) eye-ware device, one or more other types of wearable sensor devices). With these embodiments, the UE 122 can be communicatively coupled to the computing device 124, the communication device 112, and/or the one or more sensors 110 and 114 via one or more wired or wireless communication technologies (e.g., Wireless Fidelity (Wi-Fi) and BLUETOOTH® wireless technologies, etc.) and the UE 122 can relay data between the respective devices/sensor and the vehicle safety management system 102 via the communication network 104. Still in other embodiments, some or all of the features and functionalities of the vehicle safety management system 102 can be executed locally by the integrated computing device 124. Various alternative architectural configurations are envisioned.

In addition to the sensor system (e.g., comprising the one or more sensors 110 and/or 114) and the vehicle wireless communication technology, the vehicle 108 can include various additional electronic systems/devices that can be communicatively coupled to the integrated computing device 124 via wired and/or wireless communication technologies and electrically controlled (e.g., via electric signals). The additional electronic system/devices can encompass various automotive electronic domains, including but not limited to: engine electronics, transmission electronics, chassis electronics, passive safety electronics, driver assistance electronics, passenger comfort electronics, infotainment systems, and electronic integrated cockpit systems. For example, the additional vehicle electronic systems/devices can include a media system (e.g., audio and/or video), a radio system, a back-up camera system, an HVAC system, a lighting system, a cruise control system, a power locking system, a navigation system, a self-driving or semi-safe driving system, and the like. The computing device 124 can further include one or more electronic control units (ECUs) that control one or more operations of the various electronic system/device of the vehicle 108. An electronic control unit (ECU) is an embedded system in automotive electronics that controls one or more of the electrical systems/devices of a vehicle. The ECUs can include hardware, software, or a combination of hardware and software that is configured to perform functions associated with the respective vehicle electronic systems/devices. For example, different types of ECUs can include one or more of an electronic control module (ECM), a powertrain control module (PCM), a transmission control module (TCM, a brake control module (BCM), a central control module (CCM), a central timing module (CTM), a general electronic module (GEM), a body control module (BCM), a suspension control module (BCM), a door control unit (DCU), an engine control unit (ECU), an electric power steering control unit (PSCU), a human-machine interface unit (HMIU), a speed control unit (SCU), a telematic control unit (TCU), and the like. Sometimes one assembly incorporates several of the individual control modules (PCM is often both engine and transmission). The vehicle 108 can have a plurality of different dedicated ECUs for different electronic systems/devices of the vehicle 108, or one or more centralized ECUs configured to control several of the vehicle electronic systems/devices 118. Taken together, the ECUs are sometimes referred to as the vehicle's computing system.

Figure 2:
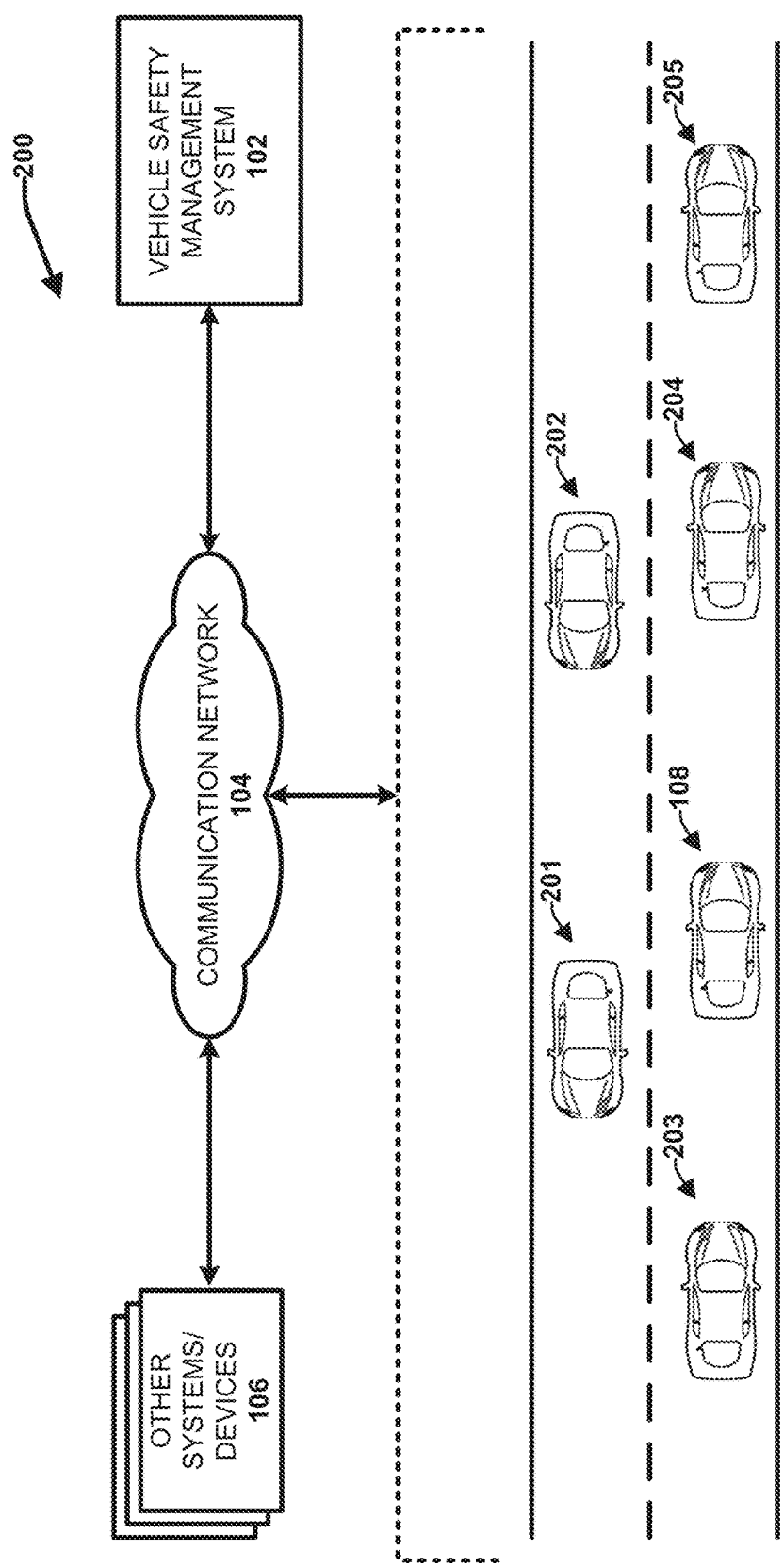
FIG. 2 illustrates another non-limiting architecture diagram of another example system that facilitates predicting and minimizing risks associated with vehicle usage contexts in accordance with one or more embodiments of the disclosed subject matter.

FIG. 2 illustrates another non-limiting architecture diagram of another example system 200 that facilitates predicting and minimizing risks associated with vehicle usage contexts in accordance with one or more embodiments of the disclosed subject matter. System 200 is similar to system 100 with the addition of surrounding vehicles 201-205 around vehicle 108. In accordance with system 200, the vehicle safety management system 102 can facilitate predicting and minimizing risks associated with a usage context of vehicle 108 over a course of operation of the vehicle 108 while accounting for the surrounding environment of the vehicle 108, including other vehicles 201-205 around the vehicle 108.

In some embodiments, the vehicle safety management system 102 can identify other vehicles located within a defined vicinity relative to the vehicle 108 and predict potential risks to the one or more other vehicles that may be attributed to vehicle 108 based on the assessment of the relative positions and characteristics of the occupants and objects of the vehicle 108. The vehicle safety management system 108 can further notify one or more surrounding vehicles 201-205 regarding any relevant risks associated with the vehicle 108 in contexts where appropriate. For example, assume the vehicle safety management system 102 determines that the box 116 carried by vehicle 108 comprises a harmful chemical substance that is not properly secured within the vehicle 108, which raises the level of risk to other vehicles around the vehicle in the event of an accident to a level warranting notification to the surrounding vehicles. In accordance with this example, based on detection of the significant risk to the surrounding vehicles (e.g., the risk to other vehicles satisfying a notification criterion) the vehicle safety management system 102 can notify the other vehicles 201-205 while in route and caution the other vehicles to maintain a safe distance away from the vehicle 108. For example, the vehicle safety management system 102 can communicate notifications with UE associated with occupant of the other vehicles and/or integrated communication systems of the other vehicles.

In some embodiments, the vehicle safety management system 102 can also communicate with surrounding vehicles 201-205 and instruct the surrounding vehicles (and/or occupants thereof) to capture (e.g., via onboard cameras and/or cameras of UE of the occupants) and provide image data of the vehicle 108 to facilitate evaluating the environment and state of the vehicle 108.

Still in other embodiments, the vehicle safety management system 102 can coordinate with one or more self-driving vehicles (e.g., drivers/autonomous vehicles) without occupants to control positioning of the one or more self-driving vehicles around a vehicle associated with a risk, such as vehicle 108 in the example above, in a manner determined to minimize the risk to other vehicles with occupants. For example, the vehicle safety management system 102 can position one or more self-driving vehicles without occupants between the risk vehicle (e.g., vehicle 108) and one or more other surrounding vehicles with occupants. With these embodiments, one or more of the surrounding vehicles 201-205 may correspond to self-driving vehicles without occupants whose positioning is remotely controlled by the vehicle safety management system 102.

Figure 3:
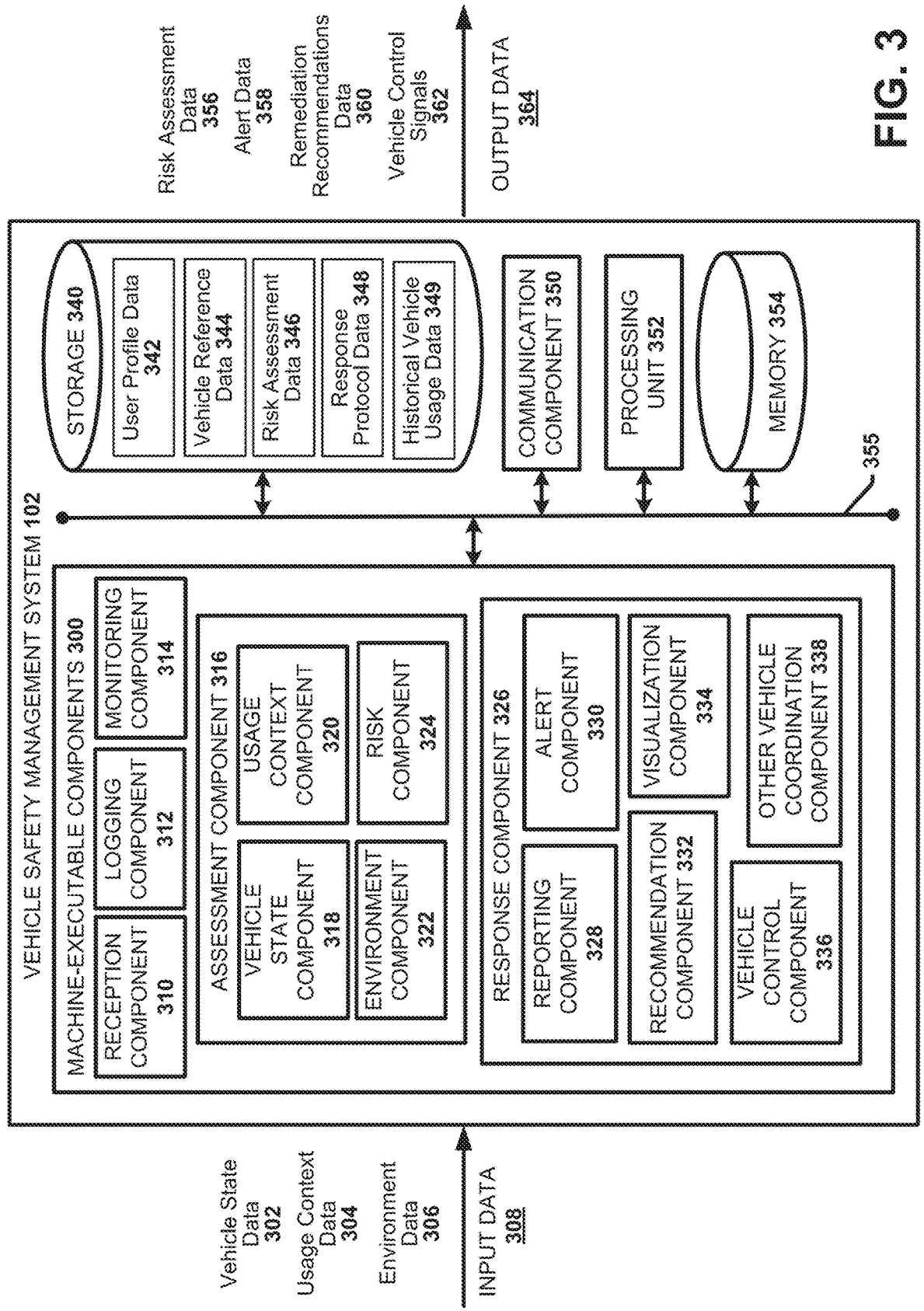
FIG. 3 presents a block diagram of an example vehicle safety management system that facilitates predicting and minimizing risks associated with vehicle usage contexts in accordance with one or more embodiments of the disclosed subject matter.

FIG. 3 illustrates a block diagram of an example, non-limiting vehicle safety management system 102 that facilitates predicting and minimizing risks associated vehicle usage contexts in accordance with one or more embodiments of the disclosed subject matter. With reference to FIGS. 1-3, the vehicle safety management system 102 includes machine-executable components 300, storage 340, communication component 350, processing unit 352 and memory 354. The vehicle safety management system further includes a system bus 355 that couples the machine-executable components 300, the storage 340, the communication component 350, the processing unit 352 and the memory 354 to one another. In some embodiments, machine-executable components 300 can be stored in memory 354 and executed by processing 352 to cause the vehicle safety management system 102 to perform operations described with respect to the corresponding components. In this regard, the vehicle safety management system can correspond to any suitable computing device or machine (e.g., a communication device, a desktop computer, a personal computer, a smartphone, a server, a virtual computing device, etc.), or interconnected group of computing devices/machine (e.g., interconnected via wired and/or wireless communication technologies). As noted above, in some embodiments, the vehicle safety management system 102 and/or one or more components thereof can be located on within the vehicle 108 (e.g., with integrated computing device 124) in association with a local deployment architecture.

The storage 340 can store a variety of information that is received by, used by, and/or generated by the vehicle safety management system 102 in association with predicting and minimizing risks associated with vehicle usage contexts. In the embodiment, shown, this information includes (but is not limited to), user profile data 342, vehicle reference data 344, risk assessment data 346, response protocol data 348 and historical vehicle usage data 349. The storage 136 can correspond to any suitable machine-readable media that can be accessed by the vehicle safety management system 102 and includes both volatile and non-volatile media, removable and non-removable media implemented in any method or technology for storage of information, such as computer-readable instructions, data structures, models, algorithms, program modules, or other data. Computer storage media can include, but is not limited to, random access memory (RAM), read only memory (ROM), erasable programmable read only memory (EPROM), flash memory or other memory technology, digital video disk (DVD) or other optical disk storage, magnetic cassettes, magnetic tape, magnetic disk storage or other magnetic storage devices, or any other medium which can be used to store the desired information and which can be accessed by the vehicle safety management system 102.

The communication component 350 can correspond to any suitable communication technology hardware and/or software that can perform wired and/or wireless communication of data between the vehicle safety management system 102 and other systems and devices, including vehicles (e.g., vehicles 108 and surrounding vehicles 201-205), UE associated with occupants of the vehicles and other users remote from the vehicles, and other systems/devices. In this regard, the communication component 350 can provide for receiving input data 305 from one or more external systems and/or devices and communicating (e.g., sending, transmitting, etc.) output data 364 to one or more external systems and/or devices. In various embodiments, some or all of the data received by (e.g., input data 308) and/or generated by (e.g., output data 364) the vehicle safety management system in association with evaluating respective usage contexts of vehicles can be logged by the system (e.g., via logging component 312) as historical vehicle usage data 349. As described in greater detail below, in some embodiments, the historical vehicle usage data 349 can be employed for machine learning purposes in association with learning correlations between factors that influence risks associated with different vehicle usage contexts and learning optimal responses that facilitate minimizing the risks. Examples of suitable communication technology hardware and/or software employable by the communication component 350 are described infra with reference to FIG. 9.

The machine-executable components 300 can include reception component 310, logging component 312, monitoring component 314, assessment component 316, vehicle state component 318, usage context component 320, environment component 322, risk component 324, response component 326, reporting component 328, alert component 330, recommendation component 332, visualization component 334, vehicle control component 336 and other vehicle coordination component 338. Various features and functionalities of the respective machine-executable components 300 are described with reference to evaluating risks associated with a usage context of vehicle 108, however it should be appreciated that vehicle safety management system 102 can be adapted to evaluate risks associated with a plurality of different vehicles and usage contexts in real-time.

In this regard, the reception component 310 can receive input data 308 in association with evaluating risks associated with vehicle usage contexts. The input data 308 can include (but is not limited to) vehicle state data 302, usage context data 304, and environment data 306. In various embodiments, the vehicle state data 302 can include information regarding the current state of the occupants and objects associated with a vehicle. In particular, the vehicle state data 302 can include information that identifies or indicates the occupants of a vehicle and characteristics of the occupants, such as the number of occupants, the identities of the occupants, and relevant characteristics of the occupants (e.g., age, height, weight, etc.). In some embodiments, respective users of the system can be associated with user profile data 342 that describes relevant information for known users/occupants of vehicles monitored by the system. With these embodiments, based on reception of information included in the user state data 302 that identifies an occupant of a vehicle (e.g., facial image data, UE data correlating a UE present within the vehicle to a known user identity, and so on), the vehicle state component 318 can look up relevant information for the corresponding occupant as included in their profile data 342.

For example, the user profile data 342 can include information that uniquely identifies different users, their vehicle or vehicles and their relevant characteristics, such as their demographics (e.g., age, height, weight, location, etc.), driving profile, driving preferences and other information. In some implementations, a user's driving profile can include information describing their driver history and known usage contexts of a one or more vehicles that the user drives. The usage contexts can relate to purpose for which the vehicle is used, such as for personal use and/or professional use in association with an occupation such as shipping and transport, ridesharing, and the like. For example, assume a driver uses their minivan some of the time in a first usage context corresponding to personal use in association with driving herself and her family of three kids around town, and a second usage context as a part-time rideshare driver (e.g., an UBER®)/LYFT® driver). The user's profile can include information that identifies these respective usage contexts of the minivan for the driver. The level of granularity of the usage context data can vary and include additional contextual details regarding the passengers typically involved in the usage context, the cargo (e.g., types of cargo typically shipped/transported), the route or routes taken, the geographic area associated with the route or routes taken, and so on. As described in greater detail below, in some embodiments, the risk evaluation and corresponding responses to potential risks identified in association with a current usage context of a vehicle can vary based on different usage contexts (e.g., risks associated with professional usage contexts may be weighted greater relative to risks associated with personal usage contexts). In some implementations, respective driver's profile data can also include driving risk level or risk score for the driver representative of a level of riskiness of the driver as a function of past accident history, age, vehicle type, etc. In some embodiments, profile data for respective users, including drivers and passengers, can also include information regarding any known medical conditions of the users that may influence their driving capabilities and/or be exacerbated in the event of an accident.

The vehicle state data 302 can further include information that identifies or indicate the objects located on or within a vehicle, excluding permanent fixtures of the vehicle, and relevant characteristics of the objects (e.g., object type, size/shape, weight, material composition, etc.). For example, as applied to vehicle 108, the vehicle state data 302 can include information that identifies or indicates the objects in the vehicle include a medium size dog (e.g., pet 118) and a box 116 containing something. The vehicle state data 302 can further include information that identifies or indicates the relative positions of occupants and objects about a vehicle (e.g., vehicle 108) and any restraints used (or not used) to restrain the occupants and objects about the vehicle.

As described with reference to system 100, in various embodiments, the relative positions and characteristics of occupants and objects about a vehicle can be determined based (at least in part) on sensor data captured via one or more sensors 110 and/or 114 of the vehicles 108. Thus, in some embodiments, the vehicle state data 302 can include the raw sensor data captured via one or more sensors 110 and/or 114. With these embodiments, the vehicle state component 318 can be configured to process the raw sensor data as it is received to determine the relative positions of occupants and objects about the vehicle and the relevant characteristics of the occupants and objects. For example, the vehicle state component 318 can process image data captured of the internal and/or external environment of the vehicle 108 using object recognition technologies, facial recognition technologies, 3D modeling technologies and the like, to determine the relative positions of occupants and objects about the vehicle and the relevant characteristics of the occupants and objects. Additional vehicle state information regarding the relative positions and characteristics of the occupants and objects can also include other sensory data captured via one or more sensors 114 (e.g., pressures sensors, acoustic sensors or microphones, motion sensors, weight sensors, proximity sensors, and so on distributed throughout the vehicle).

In some implementations of these embodiments, the vehicle state component 318 can employ vehicle reference data 344 for different vehicles (e.g., defined vehicle makes/models) to facilitate correlating raw sensor data captured via one or more sensors 110 and/or 114 (e.g., image data and sensor measurements) to information that characterizing the relative positions of occupants and objects about a vehicle. For example, the vehicle reference data 344 can include previously generated 3D models of different vehicle makes and models and the vehicle state component 318 can employ a previously generated 3D model of a current vehicle being evaluated (e.g., vehicle 108) in association with modeling the relative positions of occupants and objects about the vehicle in 3D based on captured image data and/or other sensory data from the vehicle. The vehicle reference data 344 can also include information that correlates different sensor measurements to known states or conditions of the respective vehicles (e.g., respective seat-belt detection sensors for the vehicles and others). The vehicle reference data 344 can also include various other relevant information known about different vehicle makes/models, such as operating systems of the respective vehicles, sensor configurations, communication system configurations, airbag configurations, safety systems of the respective vehicles, and so one.

In this regard, information regarding the relative positions of occupants can include information identifying or inditing their physical body position (e.g., body pose/posture) and geometry relative to the physical structures/fixtures of the vehicle in 3D space. For example, as applied to an occupant, the vehicle state component 318 can characterize how a person is sitting (or laying, standing, etc.) in a particular seat of the vehicle, such as their posture and how/where their respective body parts are positioned relative to seat, floor, ceiling, dashboard, windows, etc. (e.g., feet on the floor, cross-legged, feet on the dashboard, etc.). Similarly, information regarding the relative positions of objects can include information identifying or inditing the type of object, physical shape of the object, and the physical, spatial position of the object relative to the physical structures/fixtures of the vehicle in 3D space. Information regarding the occupants and objects can also include information regarding any restraints (e.g., seat belts, ropes, ties, pockets, containers, slots, etc.) or security mechanisms used (or not used) to secure the respective occupants and/or objects on or within the vehicle 108.

In other embodiments, some or all of the sensory data processing described above performed to characterize the occupants and objects about a vehicle can be performed by onboard processing of the captured sensory data by the vehicle itself (e.g., by the vehicle computing device 124). With these embodiments, the vehicle stat data 302 can include processed information that characterizes the occupants and objects about a vehicle, their relative positions and any restraints or lack thereof.

The vehicle state data 302 can also include information that identifies or indicates current operating parameters of respective vehicles being evaluated and monitored by the system. For example, the current operating parameters can indicate whether the vehicle is in active use or not (e.g., turned on/off). As applied to active vehicles (i.e., turned on), the current operating parameters can indicate the current speed of the vehicle and changes in speed patterns (e.g., acceleration rate, deceleration rate).

The usage context data 304 can include information that identifies or indicates a current usage context of the vehicle. The current usage context of a vehicle can generally relate to the type of transportation that the vehicle is being used for in association with a current use case. In this regard, as noted above with respect to user profile data 342, in some embodiments the system can define different usage contexts for vehicles and/or user vehicle combinations, such as personal use and professional use. The level of granularity of the different defined usage contexts can vary. For example, the different defined usage contexts can be defined in accordance with a hierarchical tree structure with personal use and professional use being primary upper nodes of the tree structure with sub-nodes and branches corresponding to sub-groups of different types of personal use and professional use. For instance, in some embodiments, the sub-groups of personal use can be based on the type of personal use associated with a vehicle, such as but not limited to, for single rider/driver transportation, for group transportation of two or more people (e.g., family/friends), for personal transport of goods, and further different categories for the types of goods (e.g., machines/equipment and tools related to a home improvement project, livestock and other animals, groceries, sports equipment, etc.). Some example sub-groups of professional use can include professional transport of people, which can be further broken down in the type of professional transport as function of the type of professional transport of people (e.g., rideshare, bus driver, taxi driver, shuttle driver, limo driver, etc.). Additional examples of sub-groups of professional use can include different categories of goods transportation based on the type of goods (e.g., mail delivery, AMAZON® delivery, flower delivery, food delivery, cake delivery, livestock delivery, vehicle delivery, etc.).

In this regard, in some embodiments, the current usage context of a vehicle can be determined or inferred by the usage context component 320 based on the occupants of the vehicle, the driver of the vehicle, objects located on or within the vehicle, the location of the vehicle, the type of the vehicle (e.g., make/model), the route of the vehicle, the time of day, and known usage contexts associated with respective vehicle/occupant combinations defined in respective occupant profile data 342. With these embodiments, the usage context data 304 can correspond to any additional information excluded from the vehicle state data 302 that identifies or indicates the current usage context of a vehicle (e.g., vehicle location, vehicle type, vehicle route, time of day and other factors. In other embodiments, the usage context data 304 can include an expressed user indication of the usage context of a vehicle, as received from the driver and/or the occupants at the time of initiation of the current usage of a vehicle.

The environment data 306 can include information the identifies or indicates the current environment of a vehicle in association with a current use case of the vehicle. The current environment can include information regarding the location of the vehicle, the route of the vehicle, the current traffic conditions associated with the current location/route, the road conditions associated with the current location and route, and current weather conditions associated with the current location/route. The current environment data 306 can also include information regarding other vehicles located within a defined area or distance of a vehicle being evaluated, such as the type of other vehicles and the current usage contexts of the other vehicles. In this regard, in some embodiments, the environment data 306 can include information, detected and reported via a navigation system employed by the vehicle or via another suitable mechanism, that identifies the current location of the vehicle, the route of the vehicle, the current traffic conditions associated with the current location/route, the road conditions associated with the current location and route, and current weather conditions associated with the current location/route. In some embodiments, the environment component 322 can determine or infer information regarding the current environment of a vehicle based on the location of the vehicle and current traffic and weather condition information associated with the current location as provided by one or more external sources accessed via the communication network 104 (e.g., traffic monitoring systems, weather reporting systems, etc.). The environment component 322 can also determine or infer information regarding the current environment of a vehicle based on sensor data captured by the vehicle regarding the external environment of the vehicle (e.g., image data captured of the external environment, proximity sensor data indicating nearby vehicles, tire sensor data indicating road conditions, etc.).

In this regard, the assessment component 316 can include vehicle state component 318 to facilitate determining or inferring the current state of a vehicle based on the vehicle state data 302. Additionally, or alternatively, the vehicle state data 302 can include information that clearly defines the current state of the vehicle. Similarly, the assessment component 316 can include usage context component 320 to facilitate determining or inferring the current usage context of a vehicle based on the usage context data 304, as facilitated using user profile data 342. Additionally, or alternatively, the usage context data 304 can include information that clearly identifies the current usage context of a vehicle. Likewise, the assessment component 316 can include environment component 322 to facilitate determining or inferring the current environment of a vehicle based on the environment data 306. Additionally, or alternatively, the environment data 306 can include information that clearly defines the current environment of the vehicle.

The assessment component 316 can further include risk component 324 that performs an assessment of risks associated with the current usage context of a vehicle based on the current state of the vehicle, the current usage context and the current environment of the vehicle. In various embodiments, the risk component 324 can be configured to perform the risk assessment in association with vehicle start up. For example, upon start up of a vehicle (e.g., activation, turning on, etc.), the assessment component 316 can receive, determine and/or infer information regarding the current state of the vehicle, the current usage context, and the environment of the vehicle. The risk component 324 can further perform an initial risk assessment in association with start up of the vehicle that involves identifying and quantifying potential risks associated with the current use of the vehicle. As described in greater detail below, the risk assessment can involve determining or inferring risks of injury/damage to occupants of the vehicle, objects of the vehicle, the vehicle itself and other vehicles based in part on analysis of how contents of the vehicle may move and become injured/ damaged and/or cause injury/damage in the event or potential accidents and/or expected driving operations (e.g., as a function of route, speed limits, stops, turns, road/traffic conditions, weather conditions, etc.).

The response component 326 can further determine and perform (or facilitate performing) various responses tailored to minimize any identified risks detected based on the initial risk assessment, such as alerting the driver to the identified risks, providing instruction regarding how to modify the position and/or arrangement and securing mechanisms of contents of the vehicle to minimize the risks, remotely controlling operations of the vehicle in a manner determined to minimize the risks and various other responses. The various responses performed by the response component 326 are described in greater detail below.

The monitoring component 314 can further monitor changes in the vehicle state data 302, the usage context data 304 and the environment data 306 over a course of operation of the vehicle (e.g., until shut-down, completion of a route, or another defined event). The assessment component 316 can similarly regularly or continuously reassess the vehicle sate data 302, the usage context data 304 and/or the environment data 306 over the course of operation of the vehicle. The risk component 324 can further regularly update the risk assessment based on changes in the vehicle state data 302, the usage context data 304 and the environment data 306 over the course of operation of the vehicle and the response component 326 can determine and perform (or facilitate performing) various responses tailored to minimize any identified risks detected based on the updated risk assessments. The logging component 312 can further log some or all information received, determined or inferred by the assessment component 316 and the response component 326 for each (or in some implementations one or more) usage scenario of a vehicle as historical vehicle usage data 349.

With reference to the risk component 324, in various embodiments, the risk component 324 can determine or infer risks of injury/damage to occupants and object located on within a vehicle as well as injury/damage to the vehicle itself and surrounding vehicles (e.g., located within a defined distance) based on the relative position/arrangement of the occupants and objects about the vehicle. The risk assessment can further account for any restraints or lack thereof, used to secure the occupants and the objects. The risk assessment can also account for the number of occupants, relevant demographics of the occupants (e.g., age, height, weight), known or existing medical conditions of the occupants, and driver risk score or risk rating. The risk assessment can also account for the respective types of the objects (e.g., different types of objects/things can be associated with different risk levels, such as pets as compared to groceries), size/weight of the respective objects, and material composition of the respective objects. The risk assessment can also account for the route of the current usage context and environmental conditions associated with the route, such as current traffic/road conditions along the route and weather conditions associated with the location/route.

In some embodiments, the risk component 324 can perform a physics analysis on possible accidents and how contents of a vehicle may move and become injured/damaged in the event of the possible accidents, and/or turbulent driving operations/conditions and/or normal driving operations/conditions. In accordance with these embodiments, the risk component 324 can simulate movement of the occupants and the objects based on the relative position and arrangement of the occupants and the objects and characteristics of the occupants and the objects (e.g., size, shape, weight, object type, retrains used/not used, etc.) about the vehicle and using a predefined 3D model of the vehicle make/model (e.g., as provided in the vehicle reference data 344). For example, in some embodiments, the risk component 324 can generate a 3D model of the current state of a vehicle including the occupants and objects in accordance with their actual position and arrangement in the vehicle. The using the 3D model, the risk component 324 can further simulate the movement of the occupants and the objects under possible accident scenarios, turbulent driving operations/conditions and/or normal driving operations/conditions and determine potential injuries/damage to the occupants, the objects, the vehicle and other vehicles based on the movement. Information controlling the physics simulations regarding the physics imparted on the vehicle and in turn on the occupants and object by the potential accident scenarios, turbulent driving operations/conditions and/or normal driving operations/conditions be predefined and tailored for each vehicle type (e.g., make/model) and included in the risk assessment data 348.

The risk component 324 can further identify all potential injuries/damage that may occur the under possible accident scenarios, turbulent driving operations/conditions and/or normal driving operations/conditions. In some implementations, in association with determining the potential injuries/damage, the risk assessment component can quantify the severities of the potential injuries/damage using predefined injury/damage valuation information for different type of injuries and damage (e.g., included in the risk assessment data 346). For example, injuries of bodily harm can be quantified as more severe than injuries than damage to inanimate objects. The risk assessment component 324 can further determine or infer the probability of occurrence of the respective injuries/damage as a function of the physics analysis and an assessment of the probability of occurrence of each potential accident evaluated, turbulent driving operation/condition evaluated and normal driving operation/condition evaluated. In some embodiments, the risk assessment component 324 can determine or infer the probability of occurrence of each potential accident evaluated, turbulent driving operation/condition evaluated and normal driving operation/condition evaluated, based on the driving history of the driver, the driver risk rating/score, the current traffic/road conditions, the route, the current weather conditions and the current time of day (e.g., daytime or nighttime). In some embodiments, the risk assessment component 324 can also determine or infer the probability of occurrence of each potential accident evaluated, turbulent driving operation/condition evaluated and normal driving operation/condition evaluated, based on a known or inferred physiological state and/or mental state of the driver (e.g., intoxication level, fatigue level, confusion level, anxiety level, etc.).

Additionally, or alternatively, the system can employ machine learning (ML) and artificial intelligence (AI) techniques to learn and infer how occupants and cargo may be harmed (e.g., injured/damaged) as a function of their position and arrangement on or within a vehicle in the event of an accident or otherwise over the course of use of the vehicle based on analysis of historical vehicle usage and accident information. In various embodiments, injury analysis can be tailored to different vehicle types (e.g., make, model, year and associated vehicle features) and usage contexts.

In some embodiments, the risk component 324 can further generate a final risk assessment report (e.g., represented in FIG. 3 as risk assessment data 356) that identifies all potential injuries/damage that may occur and further quantifies the severities of the respective injuries/damage and the aggregated probability of occurrence of the respective injuries/damage based on the respective accidents and/or conditions to which they are attributed and the probability of occurrence of the respective accidents and/or conditions.

In some implementations in which the probability of potential risk (e.g., injury/damage to occupants, objects, the vehicle and other vehicles) is below a threshold value (e.g., 1.0%, 5.0%, 10% or another low-risk probability threshold), the risk component 322 (and/or the reporting component 328) can exclude the potential risk from the risk assessment data 356.

In some embodiments, the risk component 234 can further determine one or more risk scores for the vehicle usage context based on the respective probabilities of occurrence of the one or more potential risks and the levels of severity of the respective risks. For example, in some implementations, the risk component 234 can generate an overall risk score based on the aggregated probabilities and severity of all the potential risks. Additionally, or alternatively, the risk analysis component can determine overall risk sub-scores for each of the four different risk categories where applicable, that is, a first overall risk for representing risk of injury to occupants, a second overall risk score representing risks of damage to objects/cargo, a third overall risk score representing risk of damage to the vehicle itself, and a fourth overall risk score representing risk of damage/injury to other vehicles. The risk component 324 can apply an appropriate weighting scheme for the respective risks in association with generating the risk scores based on their relative severity, importance, cost impact (e.g., financial and/or other costs) and/or various other factors. The weighting scheme can vary for objects/cargo.

The vehicle safety management system 102 can further facilitate minimizing and/or preventing occurrence of potential risks associated with a current usage context of a vehicle. In this regard, the response component 124 can provide for performing various responses (i.e., output data 364) based on the results of the risk assessment. To facilitate this end, the response component 326 can include reporting component 328, alert component 330, recommendation component 332, visualization component 334, vehicle control component 336 and other vehicle coordination component 338. In various embodiments, the responses can include, (but are not limited to): generating a report by the reporting component 328 comprising information describing the results of the risk assessment (e.g., risk assessment data 356) and providing the report to one or more occupants of the vehicle (e.g., via respective UE of the occupants and/or an in-vehicle info entertainment system comprising a display monitor and/or a speaker) and/or one or more other appropriate entities (e.g., UE of friends/family members of the occupants, emergency services personnel, etc.); generating and sending an alert (e.g., alert data 358) to the one or more occupants of the vehicle (e.g., via respective UE of the occupants and/or an in-vehicle info entertainment system comprising a display monitor and/or a speaker) and/or one or more other entities by the alert component 330 based on and/or in response to the results of the risk assessment satisfying an alert criterion (e.g., a risk assessment score exceeding a threshold, one or more of the risk probabilities exceeding a threshold risk probability, etc.); determining a recommendation (e.g., remediation recommendations data 360) regarding whether and how (e.g., with some modification, with additional/alternative safety precautions and/or securing mechanisms, etc.) the driver/occupants should rearrange, reposition and/or secure the occupants and/or objects about the vehicle) and providing the recommendation to the driver/occupants (e.g. via recommendation component 332); generating (e.g., via visualization component 334) and providing the occupants with a visualization (e.g., a 3D video/animation and/or still images) illustrating how the potential injuries/damage may occur in the event of an accident, a normal driving operation and/or a turbulent driving operation); remotely controlling (e.g., via vehicle control component 336 and provision of corresponding vehicle control signals 362 to the vehicle computing device 124 for execution thereof) an operation of the vehicle in a manner determined to minimize the risks (e.g., changing the route, controlling the speed, etc.); and coordinating with other vehicles surrounding the vehicle in a manner determined to minimize the risks (e.g., via other vehicle coordination component 338), such as notifying the other vehicles that are associated with a risk of injury attributed to the vehicle evaluated, instructing the other vehicles to distance themselves from the risky vehicle, and/or coordinating with self-driving vehicles without occupants in association with positioning the self-driving vehicles between the risky vehicle and the other vehicles.

The specific responses performed by the response component 326 and the timing of delivery of the respective responses can vary based on the specific results of the risk assessment, the vehicle usage context, user preferences (e.g., provided in the user profile data 342), and various other contextual factors. For example, the response protocol for responding to a risk of injury to cargo may be different for a usage context in which the vehicle is used professionally to ship the cargo as opposed to another usage context in which the vehicle is used for personal use. For instance, in the former usage context, the response protocol could require the alert component 330 notify the driver and company management regarding detection of a risk of damage to the cargo exceeding a first threshold, and the later usage context could require the alert component 330 only notify the driver and based on detection of the risk of damage to the cargo exceeding a second threshold that is higher (e.g., more lenient) than the first threshold. In some embodiments, the response protocol data 348 can provide defined rules and/or protocols that control the responses provided by the response component 124 as a function of various criteria, including the specific results of the risk assessment (e.g., types/severities of the injuries/damage and probability of occurrence of the injuries/damage), the vehicle usage context, the occupants of the vehicle and preferences associated with the occupants (e.g., as defined in the user profile data 342). In some embodiments in which a vehicle is shared between drivers, such as parents and teenage children for instance, one or more or the drivers can be designated as a primary driver and provide personalized rules and regulations regarding notifications and responses to be performed by the response component 326 in association with usage of the vehicle by non-primary drivers (e.g., the teenage children). For example, the primary parent driver may desire to receive notifications when their teenage child is using the vehicle in a manner associated with a high risk of injury to the vehicle and/or the occupants but not to cargo. In this regard, the response protocol data 348 (and/or user profile data 342) can also include information that identifies and controls who (i.e., what users, entities and/or machines/devices) to send specific responses to (e.g., alert data 358, risk assessment data 356 results, remediation recommendations data 360 when (i.e., timing), and the specific information disclosed in the responses.

Figure 4:
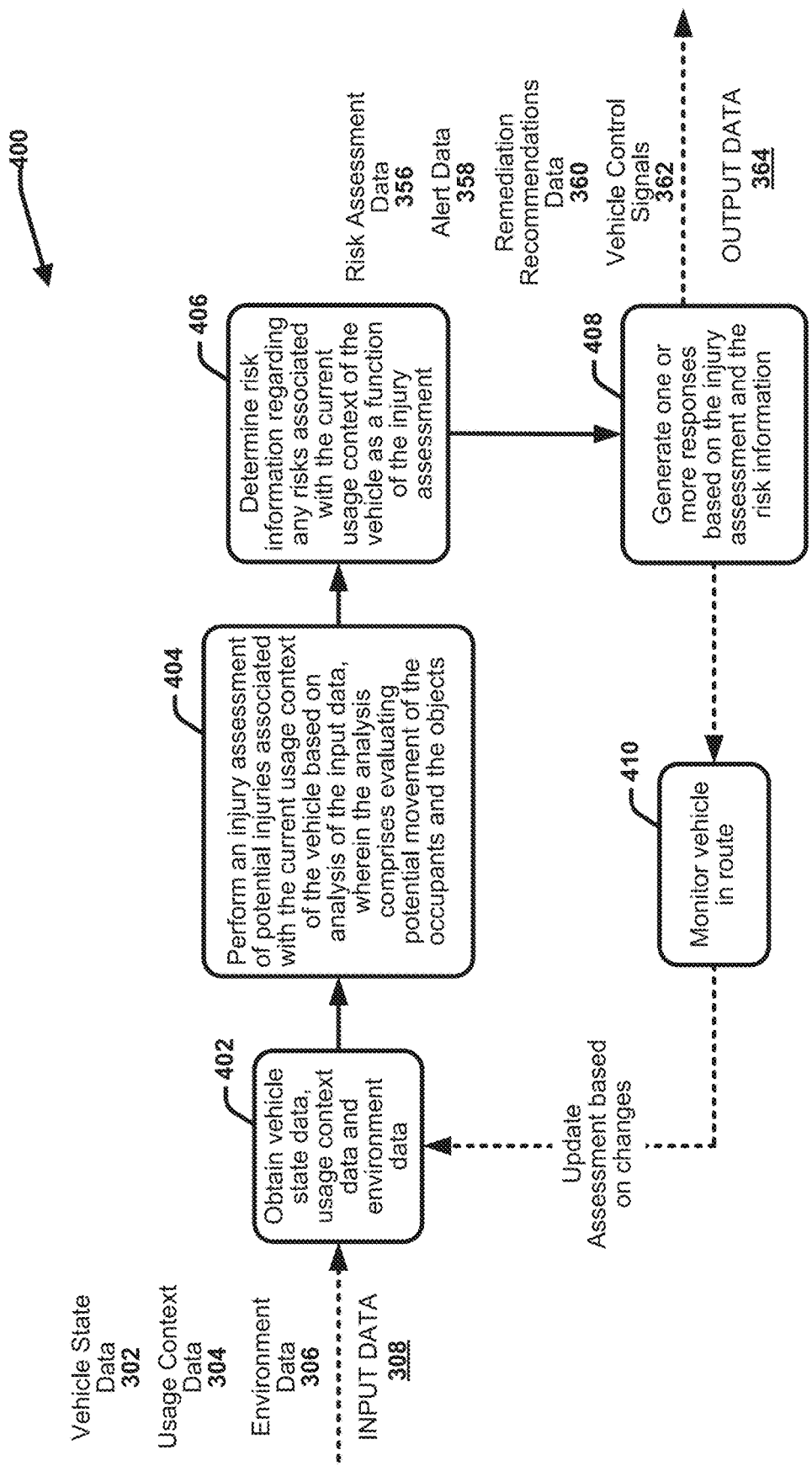
FIG. 4 presents a high-level flow diagram of another example process that facilitates predicting and minimizing risks associated with vehicle usage contexts in accordance with one or more embodiments of the disclosed subject matter.

FIG. 4 presents a high-level flow diagram of an example process 400 that facilitates predicting and minimizing risks associated with vehicle usage context in accordance with one or more embodiments of the disclosed subject matter. In various embodiments, process 400 corresponds to an example process that can be performed by the vehicle safety management system 102. Repetitive description of like elements employed in respective embodiments is omitted for sake of brevity.

In accordance with process 400, at 402, the vehicle safety management system 102 can obtain input data 308, comprising vehicle state data 302, usage context data 304 and environment data 306 for a vehicle (e.g., vehicle 108). For example, in various implementations, in association with start-up of the vehicle, the vehicle safety management system 102 can assess the internal and external environment of the vehicle and collect vehicle state data 302 and/or determine or infer the vehicle state data 302 via one or more sensors 110 and/or 114 of the vehicle, wherein the vehicle state data 302 identifies the occupants of the vehicle, including the driver and any passengers, objects of the vehicle, relative positions of the occupants and the objects about the vehicle and relevant characteristics of the occupants and the objects (e.g., restraints used and/or not used to secure the occupants and the objects, size/weight of the occupants and objects, etc.). The system can also determine or infer the usage context of the vehicle, such as whether the vehicle is being used for personal transportation and the type of personal transportation (e.g., based on the type of occupants/objects, the location, the route, the time of day, etc.) or for commercial transportation and the type of commercial transportation (e.g., rideshare, transportation of goods and the type of goods, etc.). In association with determining the usage context the usage context component 320 can determine relevant contextual information such as but not limited to, the vehicle location, the route, the road and traffic conditions, and the weather conditions. At 404, the system can perform an injury assessment of potential injuries associated with the current usage context of the vehicle based on analysis of the input data 308 (e.g., via risk component 324), wherein the analysis comprises evaluating potential movement of the occupants and the objects. At 406, the system can determine risk information regarding any risks associated with the current usage context of the vehicle as a function of the injury assessment (e.g., via the risk component 342). For example, the risk component 324 can determine information regarding potential injuries to the occupants, the object, the vehicle, and other vehicles, severity of the injuries and probability of occurrence of the potential injuries.

At 408, the system can generate one or more responses based on the injury assessment and the risk information. In this regard, depending on whether any potential injuries were identified, the type and severity of the injuries and the probability of the injuries, the responses can vary. The responses can also vary based on the usage context of the vehicle, the occupants of the vehicle, the driver and the passengers, and preferences tailored to the usage context and the occupants. In general, the responses can include providing the risk assessment data 356 to one or more occupants and/or other entities, providing alert data 358 to one or more occupants and/or other entities based on the risk assessment data satisfying an alert criterion (e.g., based on one or more of the potential injuries, a severity of the injuries and/or a probability of occurrence of the injuries), determining and recommending a remediation actions (e.g., remediation actions data 360) for performance by the occupants determined to minimize the risks (e.g., a modification to a position and/or arrangement of the occupants and/or the cargo, determining a mechanism to better secure one or more occupants and/or the cargo, etc.), and controlling one or more operations of the vehicle via corresponding vehicle control signals 362 (e.g., preventing a driving operation of the vehicle until the risks have been minimized, controlling a speed of the vehicle in a manner determined to minimize the risks, etc.). At 410, the system can further monitor the vehicle in route (e.g., via monitoring component 314) in association with determining updates to the vehicle state data 302, the usage context data 304 and the environment data 306. Process 400 can further continue repetitively over the course of the route of the vehicle, wherein the injury and risk assessment is updated based on changes/updates to the input data 308.

Figure 5:
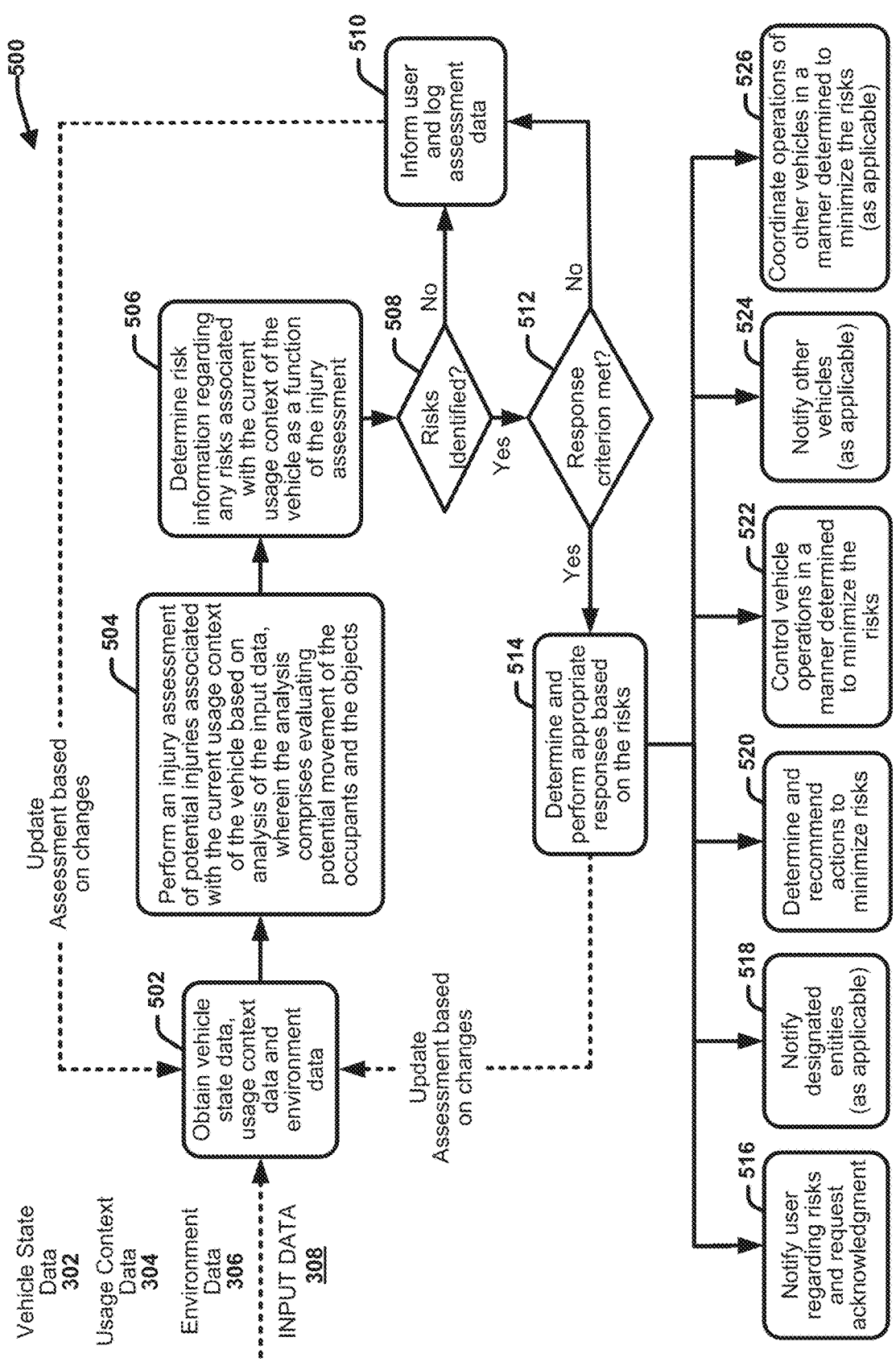
FIG. 5 presents a high-level flow diagram of another example process that facilitates predicting and minimizing risks associated with vehicle usage contexts in accordance with one or more embodiments of the disclosed subject matter.

FIG. 5 presents a high-level flow diagram of another example process 500 that facilitates predicting and minimizing risks associated with vehicle usage contexts in accordance with one or more embodiments of the disclosed subject matter. In various embodiments, process 500 corresponds to another example process that can be performed by the vehicle safety management system 102. Repetitive description of like elements employed in respective embodiments is omitted for sake of brevity.

In accordance with process 500, at 402, the vehicle safety management system 102 can obtain input data 308, comprising vehicle state data 302, usage context data 304 and environment data 306 for a vehicle (e.g., vehicle 108). For example, in various implementations, in association with start-up of the vehicle, the vehicle safety management system 102 can assess the internal and external environment of the vehicle and collect vehicle state data 302 and/or determine or infer the vehicle state data 302 via one or more sensors 110 and/or 114 of the vehicle, wherein the vehicle state data 302 identifies the occupants of the vehicle, including the driver and any passengers, objects of the vehicle, relative positions of the occupants and the objects about the vehicle and relevant characteristics of the occupants and the objects (e.g., restraints used and/or not used to secure the occupants and the objects, size/weight of the occupants and objects, etc.). The system can also determine or infer the usage context of the vehicle, such as whether the vehicle is being used for personal transportation and the type of personal transportation (e.g., based on the type of occupants/objects, the location, the route, the time of day, etc.) or for commercial transportation and the type of commercial transportation (e.g., rideshare, transportation of goods and the type of goods, etc.). In association with determining the usage context the usage context component 320 can determine relevant contextual information such as but not limited to, the vehicle location, the route, the road and traffic conditions, and the weather conditions. At 504, the system can perform an injury assessment of potential injuries associated with the current usage context of the vehicle based on analysis of the input data 308 (e.g., via risk component 324), wherein the analysis comprises evaluating potential movement of the occupants and the objects. At 506, the system can determine risk information regarding any risks associated with the current usage context of the vehicle as a function of the injury assessment (e.g., via the risk component 342). For example, the risk component 324 can determine information regarding potential injuries to the occupants, the object, the vehicle, and other vehicles, severity of the injuries and probability of occurrence of the potential injuries.

At 508, the system can determine whether any risks were identified based on the risk assessment and the injury assessment. In some embodiments, in association with determining whether any risks were identified, the system can compare apply one or more predefined threshold requirements for the risks regarding the severity and probability of occurrence of the respective injuries. In this regard, it should be appreciated that all vehicle usage is presumed to be associated with inherent risk of injury in the event of an accident. The disclosed techniques are intended to identify risks of injury that raise above a default or baseline risk level assuming perfect conditions with respect to occupant and object arrangement and safety/security mechanism employed, an optimal driver risk score, and optimal road/weather conditions. Thus, in some embodiments, at 508 the system can compare (e.g., via the risk component 324 and/or the response component 326) the risk assessment results with one or more baseline risk criteria associated with the vehicle usage context, wherein the baseline risk criteria define acceptable risk probability thresholds for injuries and/or damage to occupants, objects, the vehicle and other vehicles. The baseline risk criteria can be tailored to the vehicle type (e.g., make/model), the usage context (e.g., acceptable levels of risk can vary for different usage contexts) and defined in the risk assessment data 346.

In this regard, if at 508, the system determines that no risks were identified and/or no risks were identified that exceeded the baseline or default risks for the usage context, then at 510, the system can optionally inform the user (e.g., the driver and/or the passengers of the vehicle), log the assessment data and continue to monitor the vehicle state, usage context and environment and update the assessment based on changes. For example, the system can notify (e.g., via reporting component 328 and communication component 350) the driver and/or the occupants of the vehicle via a notification message sent to and rendered via an in-vehicle info-entertainment system (e.g., comprising a speaker and/or a display screen), and/or one or more UE (e.g., UE 120) associated with the driver and/or the occupants that the risk level associated with the current usage context of the vehicle is low and acceptable.

If at 508, the system determines that one or more risks were identified and/or one or more risks were identified that exceeded the baseline or default risks for the usage context, then at 512, the system can further determine whether any response criterion associated with the risks and the usage context are met (e.g., as defined in the response protocol data 348). In this regard, in most implementations, if risks are identified at 508, the system can be configured to at least notify the driver and/or the passengers regarding the risks. However, in some cases, the response protocol can restrict responding to identified risks based on the usage context, the type of the risk, the level/severity of the risk, the preferences of the driver/passengers, and other criteria. In this regard, if at 512 a response criterion is not met based on the identified risks, than process 500 can proceed to 510.

If at 508 the system determines that one or more response criterion are met, then at 514, the response component 326 can determine and perform the appropriate responses based on the risks. In this regard, the responses can vary depending on the type and severity of the injuries, the probability of the injuries, the usage context of the vehicle, the occupants of the vehicle, the driver and the passengers, and preferences tailored to the usage context and the occupants. The specific responses accounting for these different factors can be predefined in the response protocol data 348 and/or determined/inferred using ML and AI.

For example, in some embodiments, at 516, the alert component 330 can notify the user (e.g., the driver and/or the passengers) regarding the risks and request feedback from the user indicating acknowledgment of the risks (e.g., via notification message sent to the vehicle and/or UE associated with the driver and/or the passengers that provides a mechanism for responding with an acknowledgement). In some embodiments, the vehicle control component 336 can also remotely control one or more operations of the vehicle to prevent a driving operation of the vehicle until the acknowledgment is received. In some implementations, the notification message can include a visualization (e.g., a risk video generated by the visualization component 334) showing a rendering of the potential injuries that could occur based on the position and arrangement of the occupants and the objects.

In another example, at 518, the alert component 330 can notify one or more other designated entities regarding the risks, as applicable, such as friends/family members of the occupants, emergency services, and the like. In another example, at 520 the recommendation component 332 can determine and recommend one or more actions determined to minimize the risks. For example, the recommendation component 332 can determine one or more modifications to the position and arrangement of the occupants and the objects determined to minimize the risks of injury and/or damage. The recommendation component 332 can also determine new or alternative security mechanisms to apply to secure the occupants and/or the objects to minimize the risks of injury and/or damage.

In another example, at 522, the vehicle control component 336 control one or more operations of the vehicle in a manner determined to minimize the risks (e.g., controlling the speed of the vehicle, controlling a route of the vehicle, etc.). For example, in some implementations, based on one or more risks of injury being too high and/or severe (e.g., relative to one or more defined thresholds), the vehicle control component 336 can remotely inhibit usage of the vehicle (e.g., deactivating the vehicle and/or otherwise preventing moving the vehicle out of neutral/park mode). In another example, assume in one use case that the vehicle usage context involves transporting cakes by a baker delivery service and the risk assessment determines there is a risk of damage to the cakes based on their position/arrangement in the vehicle, the route, the weather road/conditions along the route and on. In accordance with this example, the vehicle control component 336 can determine a modification to the route and/or speed restrictions for application by the driver that minimizes the risks of damage in this context. In some implementation, the recommendation component 332 can merely recommend (e.g., via a recommendation message) the driver follow the new route and/or apply the speed restrictions. In other implementations, the vehicle control component 336 can interface with and remotely control the vehicle to restrict the maximum speed of the vehicle and/or control the route of the vehicle (e.g., via controlling the navigation system employed by the vehicle).

In other implementations in which one or more other vehicles are identified as being associated with risk of injury/damage (e.g., typically after the initial assessment and at some additional point over the course of the route), at 524, the system can notify the other vehicles regarding the identified risk attributed to the vehicle being evaluated. For example, the alter component 330 can sent alert notification to the other vehicles and/or UE associated with occupants of the other vehicles indicating the risks. Still in other embodiments, at 526, the system can coordinate with the other vehicles in a manner determined to minimize the risks (e.g., via vehicle coordination component 338). For example, in some implementations, the system can instruct the other vehicles to remain a defined distance away from the risky vehicle or change their route to maintain a safe distance away from the risky vehicle. In some implementations, the system can also coordinate with one or more self-driving vehicles without occupants to position the self-driving vehicle between the risk vehicle and the other vehicles with occupants.

Process 500 can further continue repetitively over the course of the route of the vehicle, wherein the injury and risk assessment is updated based on changes/updates to the input data 308.

Figure 6:
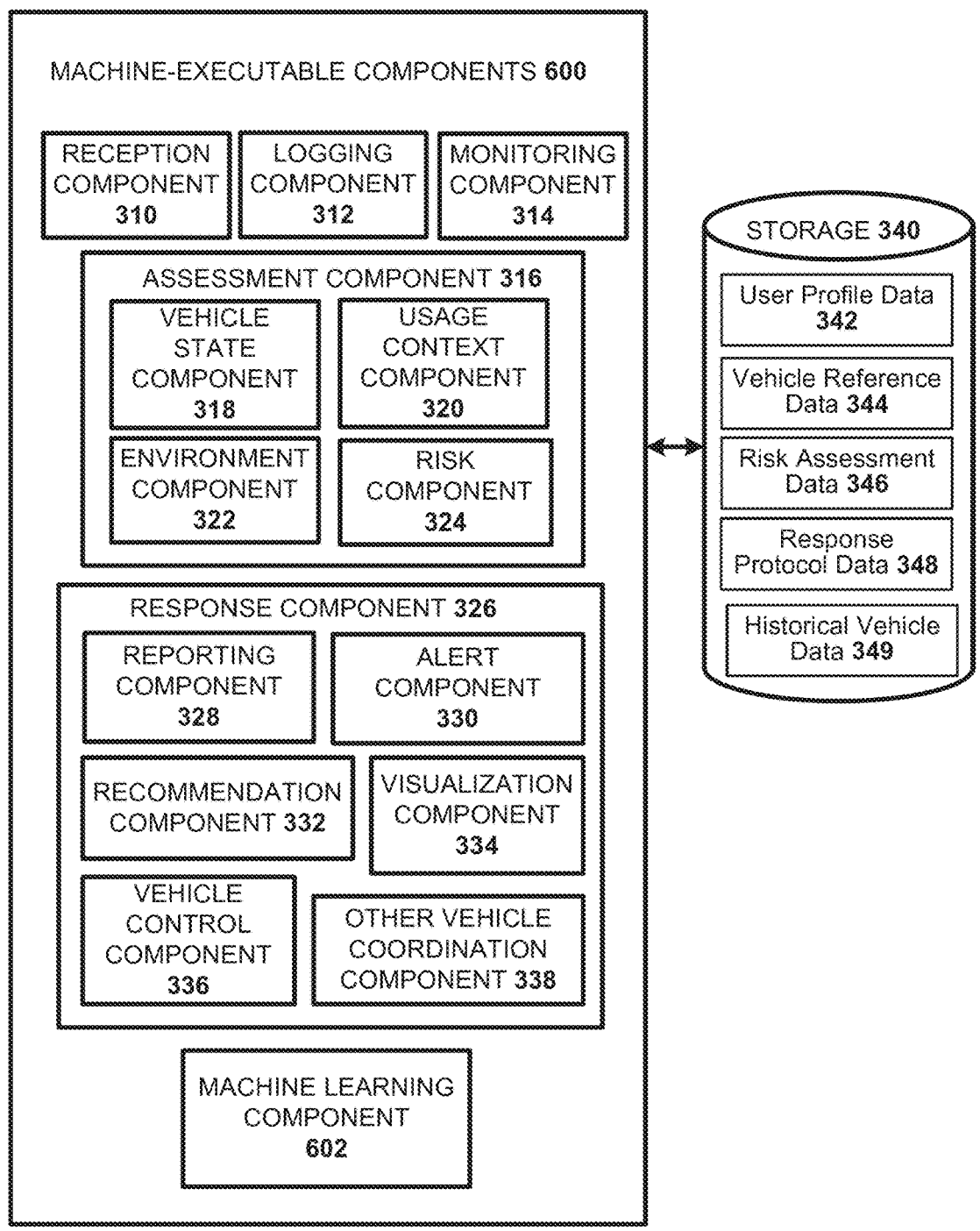
FIG. 6 illustrates example computer-executable components that can facilitate predicting and minimizing risks associated with vehicle usage contexts in accordance with one or more embodiments of the disclosed subject matter.

FIG. 6 illustrates example machine-executable components 600 that can facilitate predicting and minimizing risks associated with performance of physical tasks in accordance with one or more embodiments of the disclosed subject matter. Machine-executable components 600 are similar to computer-executable components 300 with the addition of machine learning component 602. In various embodiments, machine-executable components 600 can replace machine-executable components 300 of the vehicle safety management system 102. Repetitive description of like elements employed in respective embodiments is omitted for sake of brevity.

Various aspects of the disclosed subject matter can employ machine learning (ML) and artificial intelligence (AI) to automatically generate inferences and predictions regarding the vehicle usage context risk assessment processes described herein. To facilitate this end, the machine-executable components 600 can include machine learning component 602. In this regard, the machine learning component 602 can employ ML to facilitate various aspects of the risk assessment performed by the risk component 324. In some embodiments, the machine learning component 602 can employ ML to predict potential injuries to occupants, cargo, the vehicle and other vehicles based on learned correlations between different occupant and cargo configurations and characteristics, driver profiles, location, road/traffic conditions, weather conditions and the type of transportation occurring (e.g., the usage context). In some embodiments, the ML can develop different usage context profiles corresponding to different usage contexts of a vehicle, wherein the different usage context profiles comprise information describing the optimal position and arrangement of occupants and cargo for the different profiles, the optimal vehicle operations and route for the different usage context profiles and the risks associated with scenarios that deviate from the optimal arrangement and vehicle operations. In some embodiments, the machine learning component 602 can develop one or more ML models adapted to forecast potential injuries associated with one or more of the different vehicle usage contexts based on historical injuries associated with the respective vehicle usage contexts described in historical vehicular accident information representative of past vehicular accidents, as included in historical vehicle data 349. The machine learning component 602 can also employ the historical vehicle data 349 to learn and defined optimal responses for minimizing the injuries in association with the different vehicle usage contexts, based on past actions and responses that were effective in minimizing or preventing the corresponding injuries in same or similar usage contexts.

To facilitate this end, the machine learning component 602 can perform learning with respect to any and all of the data received by the vehicle safety management system 102 (e.g., input data 308), stored by the system 102 (e.g., user profile data 342, vehicle reference data 344, risk assessment data 346, response protocol data 348 and historical vehicle usage data 349) and generated by the computing system (e.g., output data 364). The machine learning component 602 can also evaluate relevant domain knowledge and other relevant information provided by external systems and devices 106 (e.g., weather tracking systems, road/traffic monitoring systems, emergency services systems, social medial systems, medical records systems, vehicle manufacture systems, accident reporting systems, insurance claim systems, and so on). Hereinafter, any information received by the vehicle safety management system 102, stored by the system 102, generated by the system 102 and/or accessible to the system 102 is collectively referred to as "collective machine learning data" for the machine learning component 602.

It should be appreciated that machine learning component 602 can perform learning associated with the collective machine learning data explicitly or implicitly. Learning and/or determining inferences by the machine learning component 602 can facilitate identification and/or classification of different patterns associated with the collective machine learning data, determining one or more rules associated with collective machine learning data, and/or determining one or more relationships associated with the collective machine learning data that influence determinations and inferences by the assessment component 316 and the response component 326. The machine learning component 602 can also employ an automatic classification system and/or an automatic classification process to facilitate identification and/or classification of different patterns associated with the collective machine learning data, determining one or more rules associated with collective machine learning data, and/or determining one or more relationships associated with the collective machine learning data that influence determinations and inferences by the assessment component 316 and the response component 326. For example, the machine learning component 602 can employ a probabilistic and/or statistical-based analysis (e.g., factoring into the analysis utilities and costs) to learn one or more patterns associated with the collective machine learning data, determining one or more rules associated with collective machine learning data, and/or determining one or more relationships associated with the collective machine learning data that influence determinations and inferences by the assessment component 316 and the response component 326. The machine learning component 602 can employ, for example, a support vector machine (SVM) classifier to facilitate learning patterns associated with the collective machine learning data, determining one or more rules associated with collective machine learning data, and/or determining one or more relationships associated with the collective machine learning data that influence determinations and inferences by the assessment component 316 and the response component 326. Additionally, or alternatively, the machine learning component 602 an employ other classification techniques associated with Bayesian networks, decision trees and/or probabilistic classification models. Classifiers employed by the machine learning component 602 can be explicitly trained (e.g., via a generic training data) as well as implicitly trained (e.g., via observing user behavior, receiving extrinsic information). For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)$=confidence(class).

In an aspect, the machine learning component 602 can utilize in part inference-based schemes to facilitate learning one or more patterns associated with the collective machine learning data, determining one or more rules associated with collective machine learning data, and/or determining one or more relationships associated with the collective machine learning data that influence determinations and inferences by the assessment component 316 and the response component 326. The machine learning component 602 can further employ any suitable machine-learning based techniques, statistical-based techniques and/or probabilistic-based techniques. The machine learning component 602 can additionally or alternatively employ a reduced set of factors (e.g., an optimized set of factors) to facilitate generating one or more models adapted to forecast risk associated with different vehicle usage contexts, which can be included in the risk assessment data 346 and employed by the risk component 342. For example, the machine learning component 602 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 602 can perform a set of machine learning computations associated with collective machine learning data. For example, the machine learning component 602 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations. Any rules, patterns, and/or correlations learned by the machine learning component 602 with respect to the collective machine learning data can further be stored by the vehicle safety management system (e.g., in storage 340) and applied by the machine learning component 602 to define, and/or update/refine the user profile data 342, the vehicle reference data 344, the risk assessment data 346, and the response protocol data 348.

Figure 7:
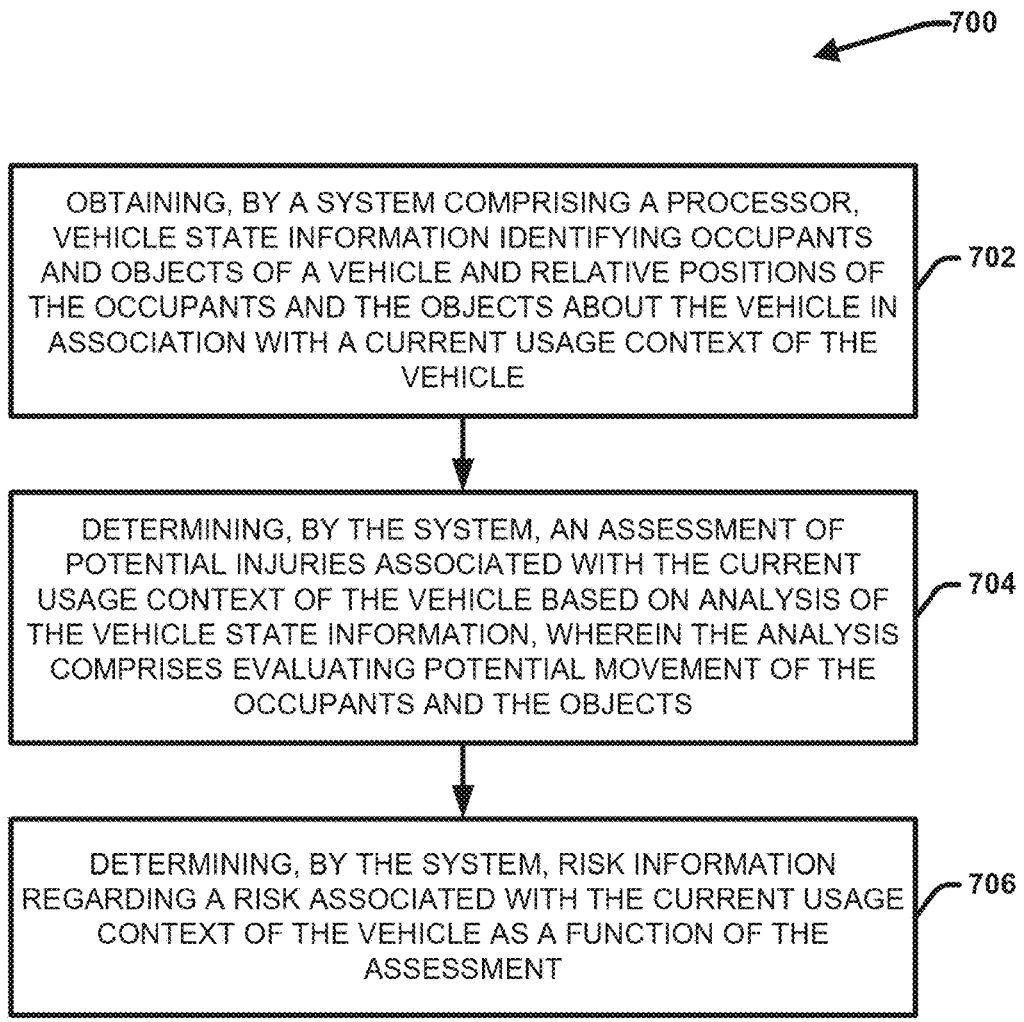
FIG. 7 presents an example computer-implemented method that facilitates predicting and minimizing risks associated with vehicle usage contexts in accordance with one or more embodiments of the disclosed subject matter.

FIG. 7 presents an example computer-implemented method 700 that facilitates predicting and minimizing risks associated with vehicle usage contexts in accordance with one or more embodiments of the disclosed subject matter. Repetitive description of like elements employed in respective embodiments is omitted for sake of brevity.

At 702, method 700 comprises, obtaining, by a system comprising a processor (e.g., vehicle safety management system 102), vehicle state information identifying occupants and objects of a vehicle and relative positions of the occupants and the objects about the vehicle in association with a current usage context of the vehicle. At 704, method 700 comprises determining, by the system (e.g., via assessment component 316), an assessment of potential injuries associated with the current usage context of the vehicle based on analysis of the vehicle state information, wherein the analysis comprises evaluating potential movement of the occupants and the objects. At 706, method 700 comprises determining, by the system (e.g., via risk component 324), risk information regarding a risk associated with the current usage context of the vehicle as a function of the assessment. In various implementations, the potential injuries can include injuries to the occupants, the objects, and the vehicle. In some implementations, method 700 can further comprise obtaining vehicle environment information regarding an environment of the vehicle and determining the assessment based on the environment information as well. For example, the environment information can relate to a second vehicle located within a defined vicinity of the vehicle and the potential injuries can further include injuries associated with the second vehicle.

In one or more implementation, method 700 can further comprise generating an alert in response to one or more of the risks satisfying an alert criterion (e.g., exceeding a risk threshold or another alter criterion), and sending the alert to a device associated with an occupant of the occupants or an entity external to the vehicle other than the occupant. The alert can enable acknowledgment of the one or more risks by the occupant or the entity, the operations further comprise tracking reception of the acknowledgement from the device based on input from the occupant or the entity to the device. In some implementations wherein the one or more risks relates to a potential injury, method 700 can further comprise sending injury information regarding the potential injury, wherein the injury information comprises a visual simulation of the potential injury. In some aspects, the system can generate the visual simulation (e.g., risk videos) based on the risk information and the analysis of the potential movement of the occupants and the objects. In various embodiments, the risk videos can be tailored based on the usage context of the vehicle and the type of the vehicle.

In some embodiments, method 700 can further comprise determining a modification to the relative positions of the occupants and the objects about the vehicle that reduces an effect of the potential injuries in response to the one or more risks being determined to satisfy an alert criterion, and sending recommendation information regarding the modification to a device associated with an occupant of the occupants. In some aspects, determining the modification can include determining a security process applicable to secure of an occupant the occupants or the objects (e.g., seat belts, child car seats, cargo harnesses and restraints, etc.). Additionally, or alternatively, method 700 can comprise determining a modification to an operation or route of the vehicle determined to reduce an effect of the potential injuries in response to the one or more risks being determined to satisfy the alert criterion or another alert criterion, and sending recommendation information regarding the modification to a device associated with an occupant of the occupants and/or controlling an operation or route of the vehicle to reduce the one or more risks. In this regard, the specific responses performed by the system (e.g., raising an alert, suggesting a modification to the position/arrangement of the occupants/cargo, controlling an operation of the vehicle, etc.) can be tailored based on the type of risk (e.g., injury/damage), the degree of risk and the vehicle usage context.

In various implementations, determining the risk information is based on the current usage context of the vehicle and a defined risk profile for the current usage context, and wherein the defined risk profile varies for different defined usage contexts. The injury and risk assessment can further account the types of the objects, the height/weight of the occupants, the health profiles of the occupants and other factors. In some aspects, the evaluating the potential movement comprises simulating the potential movement of the occupants and the objects under different vehicular accident conditions. In various embodiments, determining the assessment comprises employing a machine learning model adapted to forecast at least one of the potential injuries based on historical injuries associated with a type of the vehicle, different occupant configurations, and different object configurations described in historical vehicular accident information representative of past vehicular accidents.

Figure 8:
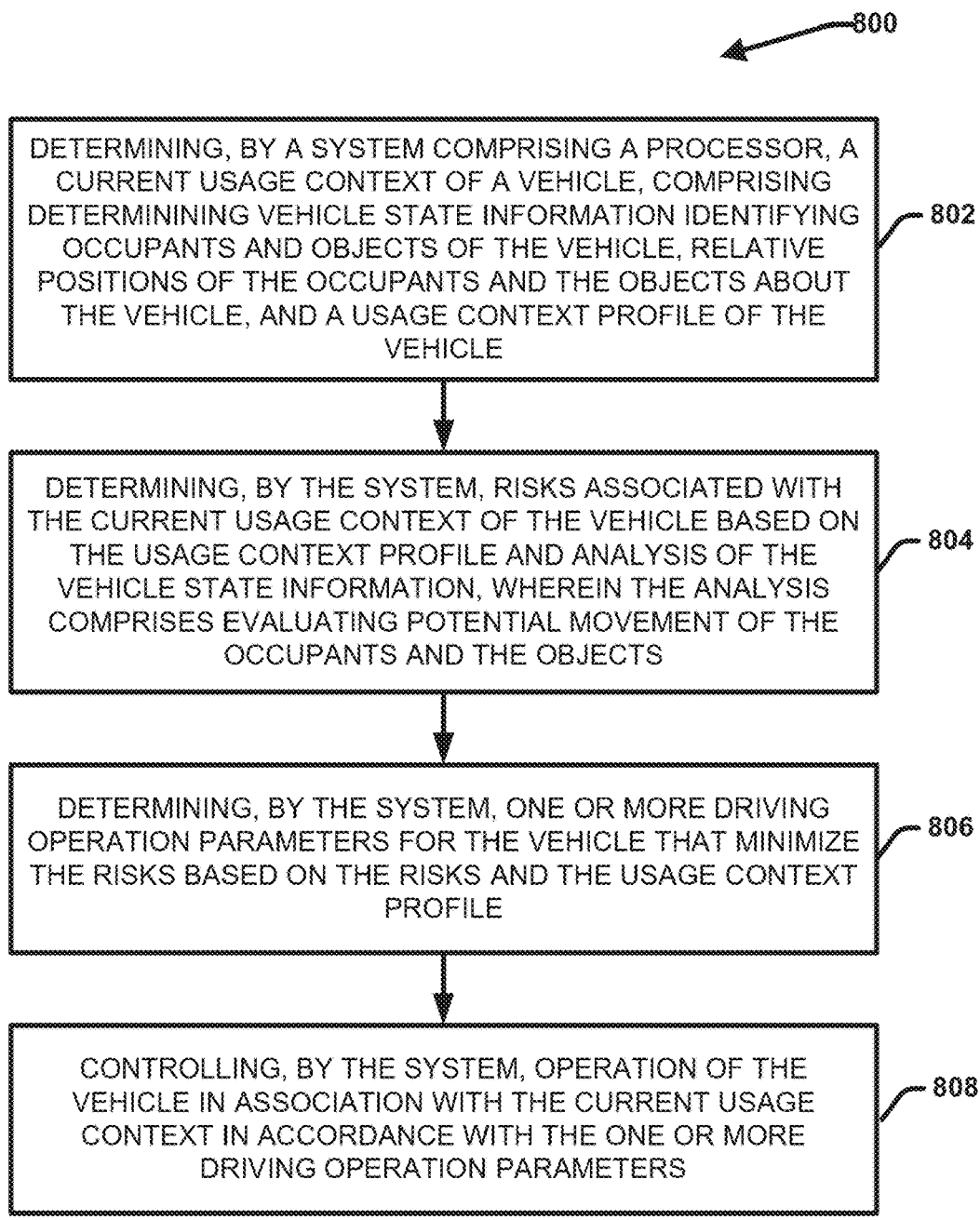
FIG. 8 presents another example computer-implemented method that facilitates predicting and minimizing risks associated with vehicle usage contexts in accordance with one or more embodiments of the disclosed subject matter.

FIG. 8 presents another example computer-implemented method 800 that facilitates predicting and minimizing risks associated with vehicle usage contexts in accordance with one or more embodiments of the disclosed subject matter. Repetitive description of like elements employed in respective embodiments is omitted for sake of brevity.

At 802, method 800 comprises, determining, by a system comprising a processor (e.g., vehicle safety management system 102), a current usage context of a vehicle, comprising determining vehicle state information identifying occupants and objects of the vehicle, relative positions of the occupants and the objects about the vehicle, and a usage context profile of the vehicle (e.g., via vehicle state component 318 and usage context component 320). At 804, method 800 comprises determining, by the system, risks associated with the current usage context of the vehicle based on the usage context profile and analysis of the vehicle state information, wherein the analysis comprises evaluating potential movement of the occupants and the objects (e.g., via risk component 324). For example, in various implementations, the usage context profile can comprise or be associated with a previously defined profile for the vehicle type, the occupants and object and the type of transportation occurring (e.g., related to personal use for personal transport, family use for family transport, rideshare, professional transport of goods, type of goods, etc.). The particular risks and level of acceptability of the risks associated with the usage context can vary depending on the usage context profile. At 806, method 800 comprises determining, by the system (e.g., via recommendation component 332 and/or vehicle control component 336), one or more driving operation parameters for the vehicle that minimize the risks based on the risks and the usage context profile. For example, the one or more driving operation parameters can include restrictions and/or parameters that control the speed of the vehicle, the route of the vehicle, the positioning of mirrors, the usage of cruise control, the usage of automated safety response mechanisms and so on. In various embodiments, the specific driving operation parameters applicable to the current usage context can be tailored and predefined based in part on the usage context profile. For example, the driving operation parameters that minimize risks associated with different usage context profiles can be learned and defined over time using ML and associated with respective usage context profiles for different vehicles and/or users (e.g., in the vehicle reference data 344, the risk assessment data 346 and/or the user profile data 342). At 808, the system can further control operation of the vehicle in association with the current usage context in accordance with the one or more driving parameters (e.g., via vehicle control component 336). For example, in some implementations, the system can inform the driver regarding the recommended driving operation parameters and recommend the driver abide by the recommended parameters. In other implementations, the vehicle control component 336 can remotely control the electromechanical settings of the vehicle (e.g., in association with sending vehicle control signals to the in-vehicle computing device 124) to cause the vehicle to apply the corresponding driving operation parameters and associated restrictions (e.g., automatically controlling the maximum speed of the vehicle at respective segments along the route).

One or more embodiments can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language or similar programming languages, and machine-learning programming languages such as like CUDA, Python, Tensorflow, PyTorch, and the like. The computer readable program instructions can execute entirely on the user's computer, partly on the user's computer, as a stand-alone software package, partly on the user's computer and partly on a remote computer or entirely on the remote computer or server using suitable processing hardware. In the latter scenario, the remote computer can be connected to the user's computer through any type of network, including a local area network (LAN) or a wide area network (WAN), or the connection can be made to an external computer (for example, through the Internet using an Internet Service Provider). In various embodiments involving machine-learning programming instructions, the processing hardware can include one or more graphics processing units (GPUs), central processing units (CPUs), and the like. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
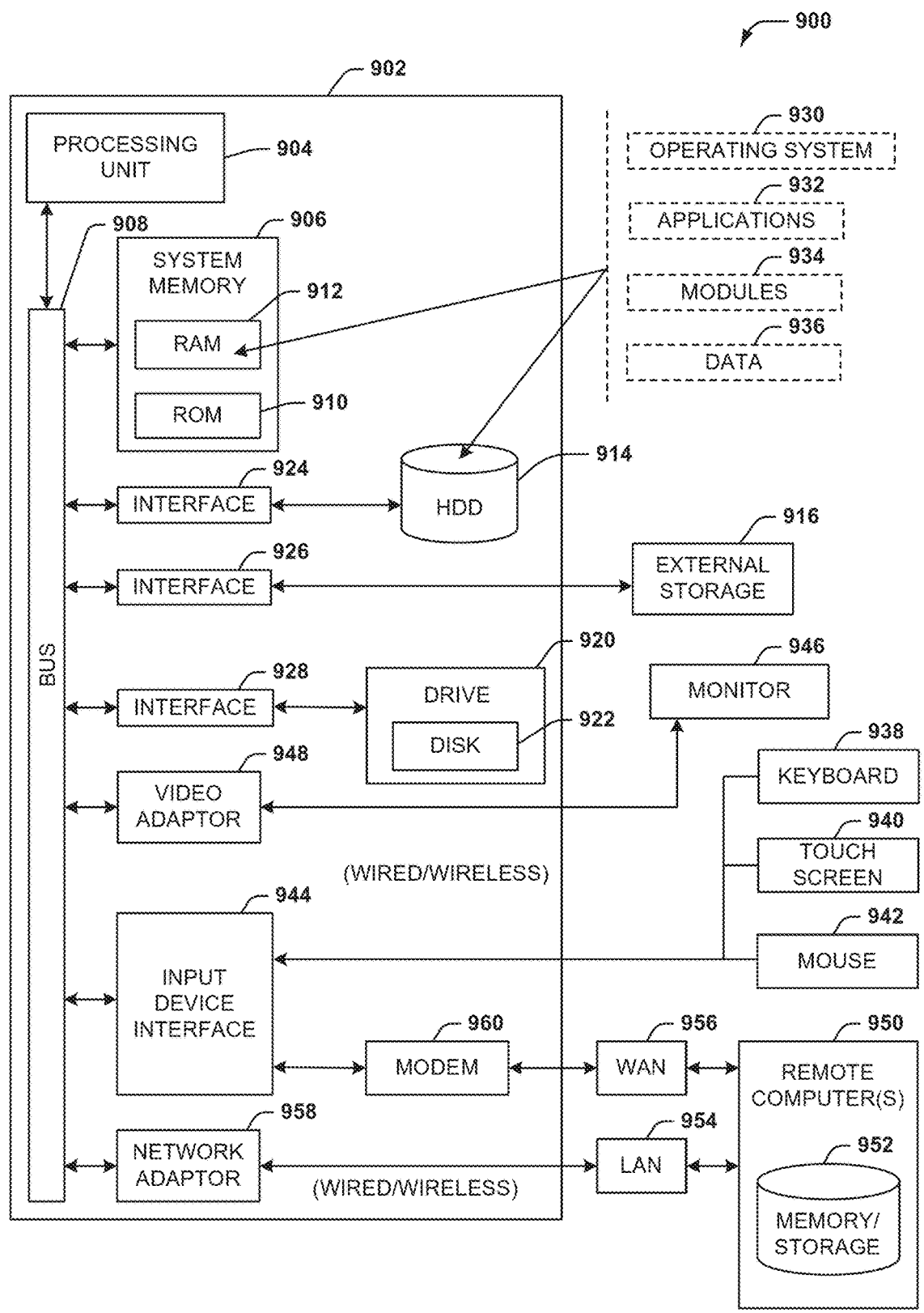
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The illustrated aspects of the disclosure may also be practiced in distributed computing environments where certain tasks are performed by remote processing devices that are linked through a communications network. In a distributed computing environment, program modules can be located in both local and remote memory storage devices.

Figure 10:
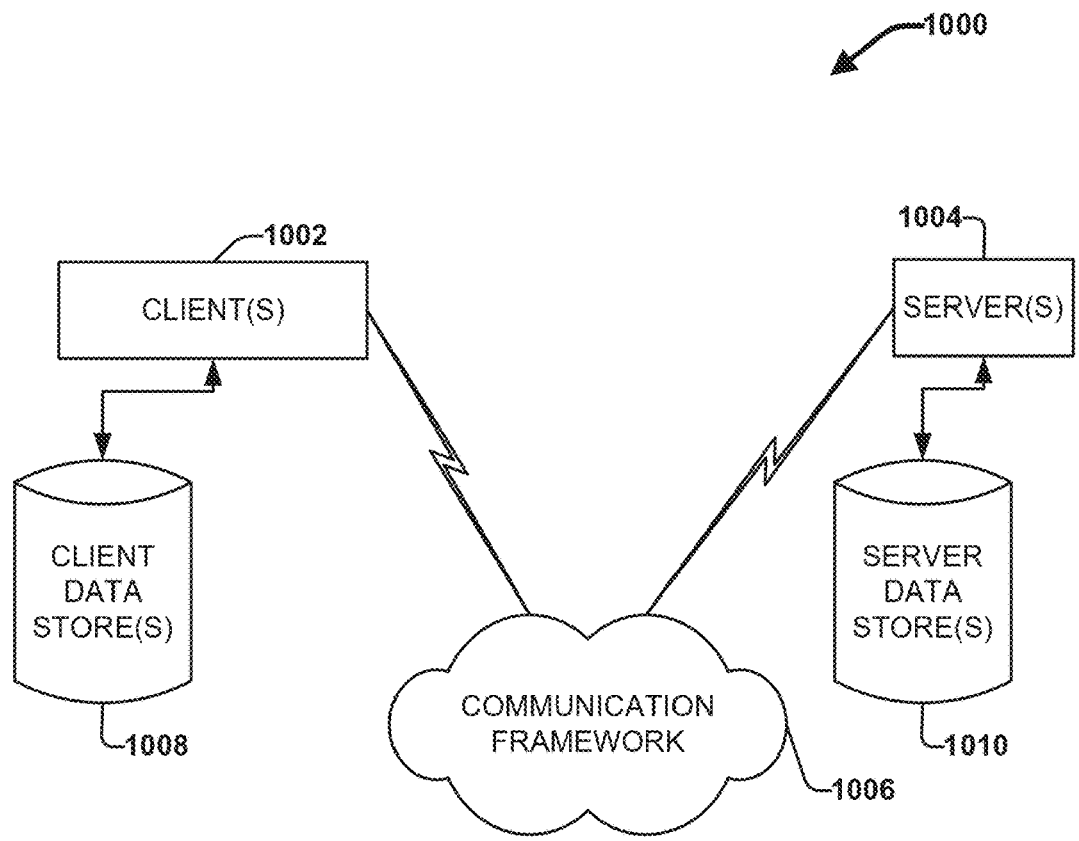
FIG. 10 illustrates a block diagram of another example, non-limiting operating environment in which one or more embodiments described herein can be facilitated.

Referring to FIG. 10, there is illustrated a schematic block diagram of a computing environment 1000 in accordance with this disclosure in which the subject systems (e.g., system 100, system 200 and the like), methods and computer readable media can be deployed. The computing environment 1000 includes one or more client(s) 1002 (e.g., vehicles, smart vehicles, UE, IoT devices, sensors, and other communication devices, etc.). The client(s) 1002 can be hardware and/or software (e.g., threads, processes, computing devices). The computing environment 1000 also includes one or more server(s) 1004 (e.g., one or more servers at which the vehicle safety management system 102 and/or components thereof at deployed). The server(s) 1004 can also be hardware or hardware in combination with software (e.g., threads, processes, computing devices). The servers 1004 can house threads to perform transformations by employing aspects of this disclosure, for example. In various embodiments, one or more components, devices, systems, or subsystems of system 100 and system 200 can be deployed as hardware and/or software at a client 1002 and/or as hardware and/or software deployed at a server 1004. One possible communication between a client 1002 and a server 1004 can be in the form of a data packet transmitted between two or more computer processes wherein the data packet may include all or portion of input data 308, all or portion of output data 364, and the like. The data packet can include a metadata, e.g., associated contextual information, for example. The computing environment 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002. Similarly, the server(s) 1004 are operatively include or are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 can compress the file in accordance with the disclosed subject matter. Likewise, server 1004 can encode video information and transmit the information via communication framework 1006 to one or more clients 1002.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "subsystem" "platform," "layer," "gateway," "interface," "service," "application," "device," and the like, can refer to and/or can include one or more computer-related entities or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor; and
a memory that stores executable instructions that, when executed by the processor, facilitate performance of operations, comprising:
obtaining vehicle state information identifying occupants and objects of a vehicle and relative positions of the occupants and the objects about the vehicle in association with a current usage context of the vehicle, wherein the obtaining vehicle state information comprises receiving sensor data regarding an internal environment of the vehicle and an external environment of the vehicle from one or more sensors mounted on the vehicle;
determining an assessment of potential injuries associated with the current usage context of the vehicle based on analysis of the vehicle state information, wherein determining the assessment comprises evaluating potential movement of the occupants and the objects;

determining risk information regarding a risk associated with the current usage context of the vehicle as a function of the assessment; and modifying an operation or a route of the vehicle resulting in a reduction of the risk associated with the current usage context of the vehicle, wherein the modifying the operation or the route of the vehicle is in response to the determining the risk information.

2. The system of claim 1, wherein the potential injuries comprise injuries to the occupants, the objects, and the vehicle.

3. The system of claim 1, wherein the operations further comprise obtaining vehicle environment information regarding an environment of the vehicle, wherein determining the assessment is further based on the environment information, wherein the environment information relates to a second vehicle located within a defined vicinity of the vehicle, and wherein the potential injuries comprise injuries associated with the second vehicle.

4. The system of claim 1, wherein the operations further comprise:
generating an alert in response to the risk satisfying an alert criterion; and
sending the alert to a device associated with an occupant of the occupants or an entity external to the vehicle other than the occupant.

5. The system of claim 4, wherein the alert enables acknowledgment of the risk by the occupant or the entity, and wherein the operations further comprise:
tracking reception of the acknowledgement from the device based on input from the occupant or the entity to the device.

6. The system of claim 2, wherein the risk relates to a potential injury of the potential injuries, and wherein the operations further comprise:
sending injury information regarding the potential injury, wherein the injury information comprises a visual simulation of the potential injury.

7. The system of claim 6, wherein the operations further comprise:
generating the visual simulation based on the risk information.

8. The system of claim 1, wherein the operations further comprise:
determining a modification to the relative positions of the occupants and the objects about the vehicle that reduces an effect of the potential injuries in response to the risk being determined to satisfy an alert criterion; and
sending recommendation information regarding the modification to a device associated with an occupant of the occupants.

9. The system of claim 8, wherein determining the modification comprises determining a security process applicable to secure of an occupant the occupants or the objects.

10. The system of claim 1, wherein the operations further comprise:
determining a modification to an operation or route of the vehicle determined to reduce an effect of the potential injuries in response to the risk being determined to satisfy an alert criterion; and
sending recommendation information regarding the modification to a device associated with an occupant of the occupants.

11. The system of claim 1, wherein the modifying the operation or the route of the vehicle to comprises reducing speed of the vehicle to thereby reduce the risk associated with the current usage context of the vehicle.

12. The system of claim 1, wherein determining the risk information is based on the current usage context of the vehicle and a defined risk profile for the current usage context, and wherein the defined risk profile varies for different defined usage contexts.

13. The system of claim 1, wherein evaluating the potential movement comprises simulating the potential movement of the occupants and the objects under different vehicular accident conditions.

14. The system of claim 1, wherein determining the risk is further based on a type of at least one of the objects.

15. The system of claim 1, wherein determining the assessment comprises employing a machine learning model adapted to forecast at least one of the potential injuries based on historical injuries associated with a type of the vehicle, different occupant configurations, and different object configurations described in historical vehicular accident information representative of past vehicular accidents.

16. A method, comprising:
obtaining, by a system comprising a processor, vehicle state information identifying occupants and objects of a vehicle and relative positions of the occupants and the objects about the vehicle in association with a current usage context of the vehicle, wherein the obtaining vehicle state information comprises receiving sensor data regarding an internal environment of the vehicle and an external environment of the vehicle from one or more sensors mounted on the vehicle;
determining, by the system, an assessment of potential injuries associated with the current usage context of the vehicle based on analysis of the vehicle state information, wherein determining the assessment comprises evaluating potential movement of the occupants and the objects;
determining, by the system, risk information regarding a risk associated with the current usage context of the vehicle as a function of the assessment; and
controlling, by the system, an operation or a route of the vehicle resulting in a reduction of the risk associated with the current usage context of the vehicle, wherein the controlling the operation or the route of the vehicle is in response to the determining the risk information.

17. The method of claim 16, further comprising:
obtaining, by the system, vehicle environment information regarding an environment of the vehicle, wherein determining the assessment is further based on the environment information, wherein the environment information relates to a second vehicle located within a defined vicinity of the vehicle, and wherein the potential injuries comprise injuries associated with the second vehicle.

18. The method of claim 16, further comprising:
generating, by the system, an alert in response to the risk satisfying an alert criterion; and
sending, by the system, the alert to a device associated with an occupant of the occupants or an entity external to the vehicle other than the occupant.

19. A non-transitory machine-readable medium, comprising executable instructions that, when executed by a processor, facilitate performance of operations, comprising:
obtaining vehicle state information identifying occupants and objects of a vehicle and relative positions of the occupants and the objects about the vehicle in association with a current usage context of the vehicle, wherein the obtaining vehicle state information comprises receiving sensor data regarding an internal environment of the vehicle and an external environment of the vehicle from one or more sensors mounted on the vehicle;

determining an assessment of potential injuries associated with the current usage context of the vehicle based on analysis of the vehicle state information, wherein determining the assessment comprises evaluating potential movement of the occupants and the objects;

determining risk information regarding a risk associated with the current usage context of the vehicle as a function of the assessment; and controlling an operation or a route of the vehicle resulting in a reduction of the risk associated with the current usage context of the vehicle, wherein the controlling the operation or the route of the vehicle is in response to the determining the risk information.

20. The non-transitory machine-readable medium of claim 19, the operations further comprising:

generating an alert in response to the risk satisfying an alert criterion; and sending the alert to a device associated with an occupant of the occupants or an entity external to the vehicle other than the occupant.

* * * * *